United States Patent [19]

Campbell

[11] Patent Number: 5,694,596
[45] Date of Patent: Dec. 2, 1997

[54] ON-LINE DATABASE UPDATING NETWORK SYSTEM AND METHOD

[75] Inventor: R. David L. Campbell, Stamford, Conn.

[73] Assignee: Kangaroo, Inc., Seattle, Wash.

[21] Appl. No.: 452,596

[22] Filed: May 25, 1995

[51] Int. Cl.[6] .............................. G06F 17/30; G06F 7/00
[52] U.S. Cl. .................. 395/610; 395/614; 395/200.03; 395/200.08; 395/200.11; 395/200.15
[58] Field of Search ............................. 395/600, 610, 395/614, 3, 200.03, 200.11, 200.08, 200.15

[56] References Cited

U.S. PATENT DOCUMENTS

| | | | |
|---|---|---|---|
| 4,558,413 | 12/1985 | Schmidt et al. | 364/300 |
| 4,796,293 | 1/1989 | Blinken et al. | 379/202 |
| 4,897,782 | 1/1990 | Bennett et al. | 364/200 |
| 4,928,225 | 5/1990 | McCarthy et al. | 364/200 |
| 5,029,070 | 7/1991 | McCarthy et al. | 364/200 |
| 5,043,886 | 8/1991 | Witeh et al. | 364/200 |
| 5,113,514 | 5/1992 | Albonesi et al. | 395/425 |
| 5,119,485 | 6/1992 | Ledbetter, Jr. et al. | 395/425 |
| 5,388,255 | 2/1995 | Pytleck et al. | 395/600 |
| 5,404,488 | 4/1995 | Kerrigan et al. | 395/425 |
| 5,485,609 | 1/1996 | Vitter et al. | 395/600 |
| 5,493,607 | 2/1996 | Arumainayagam et al. | 379/88 |
| 5,495,610 | 2/1996 | Shing et al. | 395/600 |
| 5,497,491 | 3/1996 | Mitchell et al. | 395/700 |
| 5,499,371 | 3/1996 | Henninger et al. | 395/700 |
| 5,504,888 | 4/1996 | Iwamoto et al. | 395/600 |
| 5,511,208 | 4/1996 | Boyles et al. | 395/800 |

FOREIGN PATENT DOCUMENTS 0 127 753  12/1984  European Pat. Off. ......... G06F 7/22

*Primary Examiner*—Thomas G. Black
*Assistant Examiner*—Jean M. Corrielus
*Attorney, Agent, or Firm*—David Newman & Associates, P.C.

[57] ABSTRACT

An on-line database updating network system and method using object-oriented programming to build a program of discrete blocks, with each block being separately accessible, modifiable, and replaceable. The system includes a user terminal, a host terminal, and a communications channel. Origin dates of user module blocks of information stored in the user terminal are compared, over the communications channel, with origin dates of corresponding host module blocks of information stored in the host terminal. Host module blocks having origin dates more recent than corresponding user module blocks are downloaded as updated blocks over the communications channel to the user terminal. The downloaded updated blocks are then used to update the relevant user module blocks of information. Alternate host terminals may also be accessed by the user terminal, and updated alternate host module blocks of information may be downloaded to the user terminal.

21 Claims, 14 Drawing Sheets

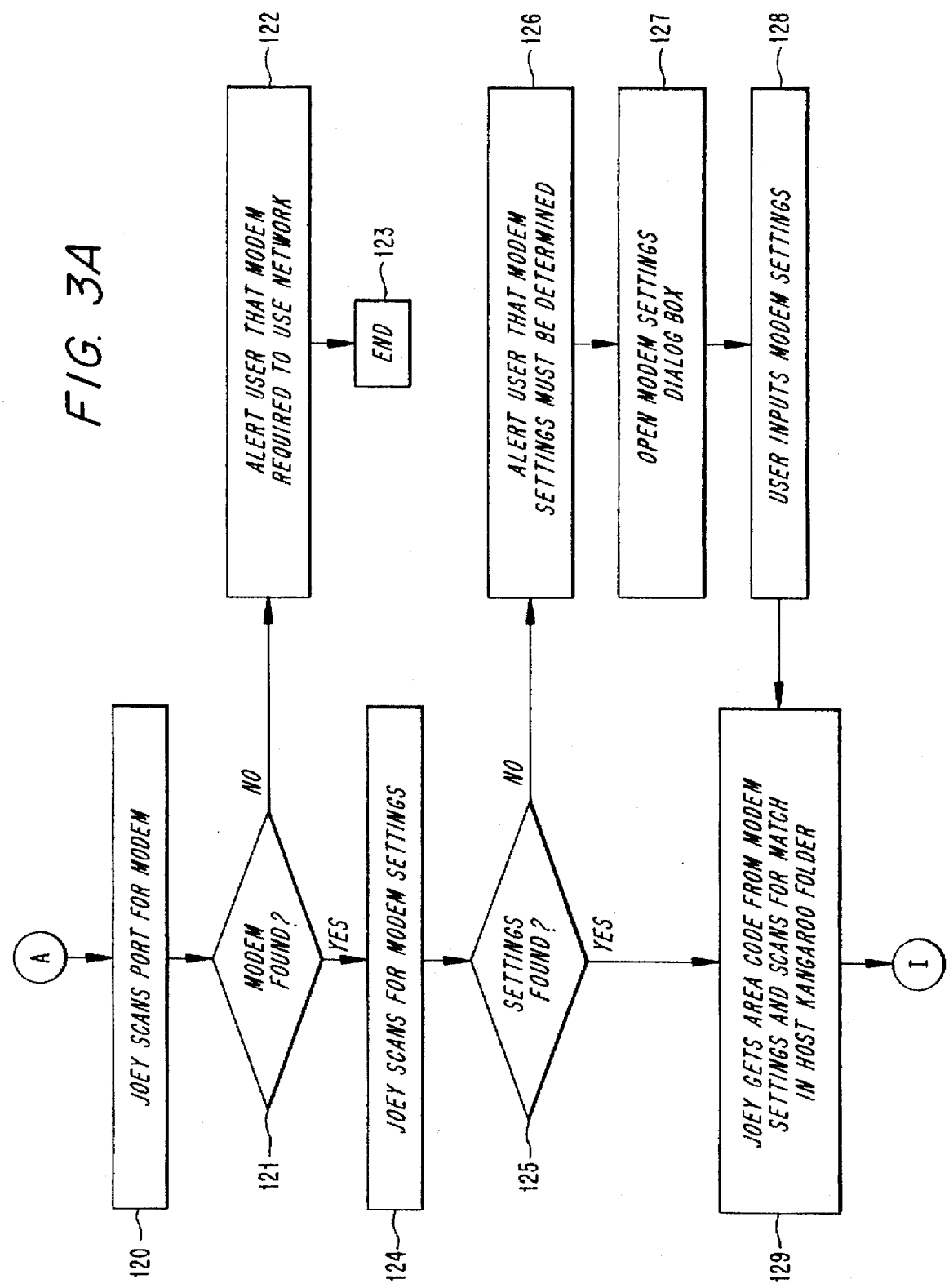

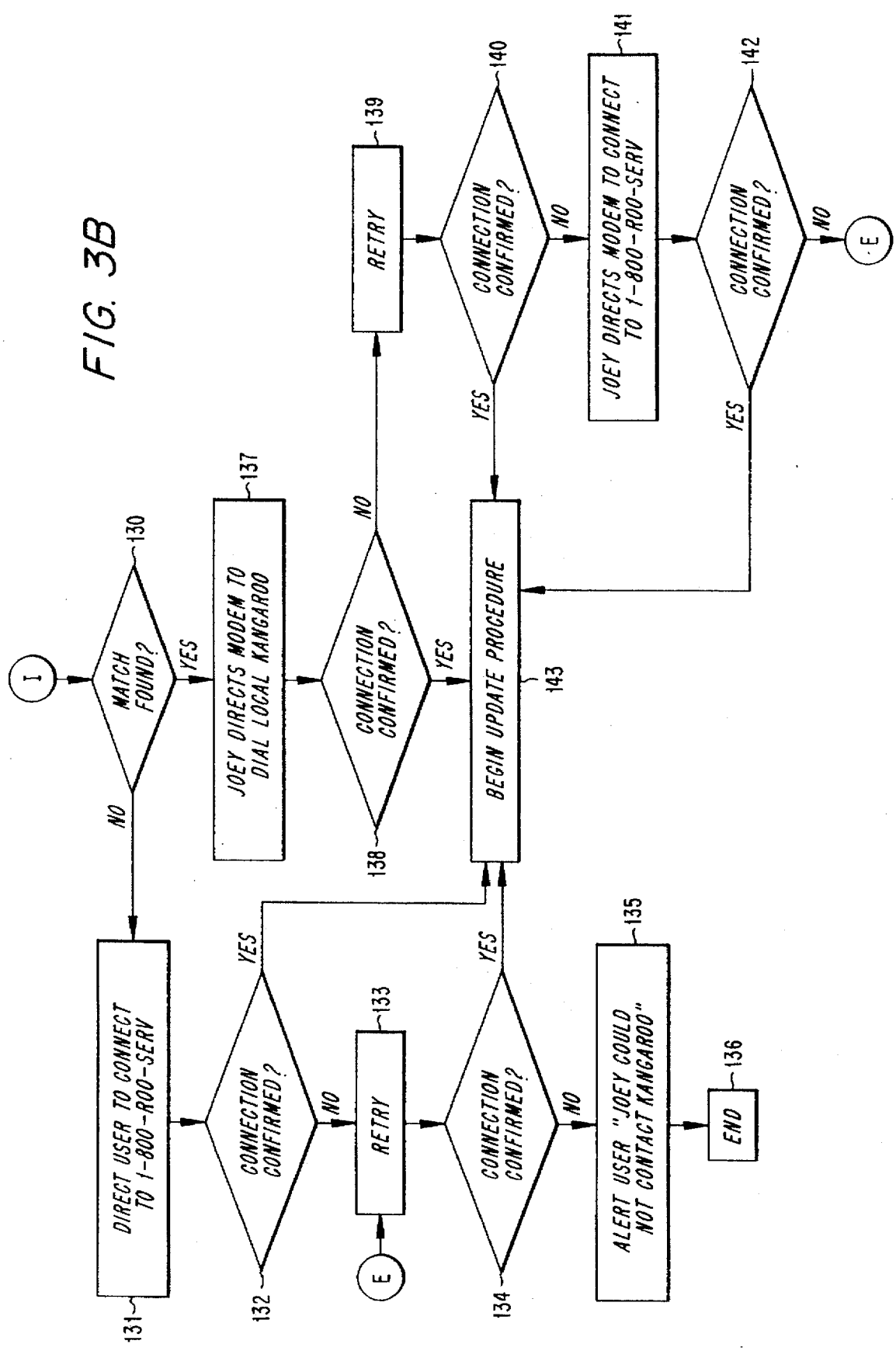

ON-LINE DATABASE UPDATING NETWORK SYSTEM AND METHOD

BACKGROUND OF THE INVENTION

This invention relates to on-line database networking and more particularly to the application of an on-line database updating network to responsible materials selection.

DESCRIPTION OF THE RELEVANT ART

Heightened public and private awareness of environmental and ecological concerns has created a need for specialized information management. Problems of a tangible nature, such as landfill shortages, and problems of a less comprehensible nature, such as ozone depletion, have brought waste reduction and recycling to the front page of many fields of design, engineering, planning, and legislation.

Professional practices in the fields of design, engineering, planning, and legislation require the specification of materials to be used during production and/or construction of an object or environment. Informed materials selection, if done properly, can greatly reduce the stress put on ecosystems and societies by specifying "sustainable" materials and processes. Additionally, through the use of resources that enable responsible material selection at the outset of a project, the potential need for costly design changes later in the project lifecycle may be minimized.

The goal of providing environmentally responsible and sustainable materials and processes is a difficult one due to the diffused nature of the varied sources of information. Object and image creators require a designed, comprehensive research tool or reference resource to allow them to make inherently responsible and necessary choices quickly. Currently, time is the primary inhibitor of such research. Usually, by the time the appropriate information is located, the project is already done and "out the door". To provide the information necessary to the making of informed materials decisions, a resource is needed that will unify and organize the necessary information in one place.

In addition to the need for information management to facilitate research in the areas of ecologically responsible materials, materials processing, and materials recycling, there is also a need to make on-line communications and programs act in a more intuitive, less confusing, and less costly manner.

OBJECTS OF THE INVENTION

A general object of the invention is an on-line database updating network using object-oriented programming to support selective program updating by module blocks.

Another object of the invention is environmentally responsible materials selection through on-line networking of databases.

An additional object of the invention is a method of selectively updating subparts of user databases using object-oriented programming to build a program out of discrete "blocks" of code, where each block may be contained, accessed, modified or replaced by other blocks.

A further object of the invention is a desk reference educational guide to materials for architects, engineers, and industrial and graphics designers.

SUMMARY OF THE INVENTION

According to the present invention, as embodied and broadly described herein, an on-line database updating network and method is provided.

The communications network of the present invention comprises a communications channel, a user terminal, and a host terminal. The user terminal may include a user memory, user-input means, user display, a user processor, and a user-connecting means. The input means and the connecting means may be embodied as a keyboard and a user data port, respectively.

The user data port is connected to the communications channel. The user processor is connected to the user data port. The user memory and the keyboard are connected to the user processor. The user display is connected to the keyboard and to the user processor.

The user data port interfaces between the user terminal and the communications channel. The user memory stores a plurality of user modules in a modules folder; each user module includes a plurality of user module blocks of information. The keyboard inputs user identification data and other data to the user processor and/or the user memory. The user display displays messages and screens to the user. The user processor processes user input data, locates the data port, and accesses the communications channel.

The host terminal includes host-communications means, host-connecting means such as a host data port, a host memory, and a host processor.

The host data port is connected to the communications channel. The host processor is connected to the host data port. The host memory is connected to the host processor.

The host data port interfaces between the host terminal and the communications channel. The host processor receives user information data and other data sent from the user terminal to the host terminal using the communications channel. The host processor also sends host data from the host terminal to the user terminal using the communications channel. The host memory stores a plurality of host modules; each host module includes a plurality of host module blocks of information.

In use of a representative embodiment of the present invention, a user inputs user identification data into the user terminal using the keyboard. In response to the user identification data, the user processor scans the user memory for user modules in the user modules folder. In response to locating a user module having a user origin date, the user processor scans the user data port for a host terminal. In response to finding a host terminal, the user processor accesses the communications channel to connect with the host terminal. The user terminal sends user identification data and data on the user module to the host terminal.

The host terminal, operatively coupled to the user terminal through the communications channel, receives the user identification data from the user terminal. In response to the user identification and user module data, the host processor sends, over the communications channel, a host origin date for a host module corresponding to the user module. Responsive to receiving the host origin date for the host module, the user processor compares the host origin date for the host module to the user origin date for the corresponding user module. In response to determining that the host origin date is more recent than the user origin date, the user processor identifies those host module blocks of information, within the host module, having origin dates more recent than corresponding user module blocks of information, within the user module, as updated blocks. The user processor then downloads to the user memory the updated blocks, and replaces the older user module blocks of information with the downloaded updated blocks.

The present invention also may be embodied as a method for updating databases using a network including a user terminal, a host terminal, and a communications channel.

The user terminal includes a display, a data port, and a user terminal memory for storing user modules comprising user module blocks of information in a modules folder. The host terminal includes a host terminal memory for storing host modules comprising host module blocks of information.

The method of the present invention comprises the steps of activating the user terminal, scanning the modules folder in the user terminal memory for stored user modules, and locating a stored user module having a user origin date. The method further comprises the steps of locating a host terminal, scanning the host terminal memory for stored host modules, and locating a stored host module corresponding to the stored user module and having a host origin date. The method then comprises the steps of retrieving from the user terminal memory the user origin date, and comparing by the user terminal the user origin date and the host origin date. In response to the host origin date being more recent than the user origin date, the user terminal identifies those host module blocks of information having origin dates more recent than corresponding user module blocks of information as updated blocks, and downloads the updated blocks into the user terminal memory. The stored user module is then updated with the downloaded updated blocks and the host origin date.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention. The terminology used in the FIGURES is defined and explained in the Detailed Description of the Perferred Embodiments.

FIG. 3 depicts a flow chart of the remote access procedure using the method of the present invention;

DETAILED DESCRIPTION OF THE PREFERRED EMBODIMENTS

Figure 1:
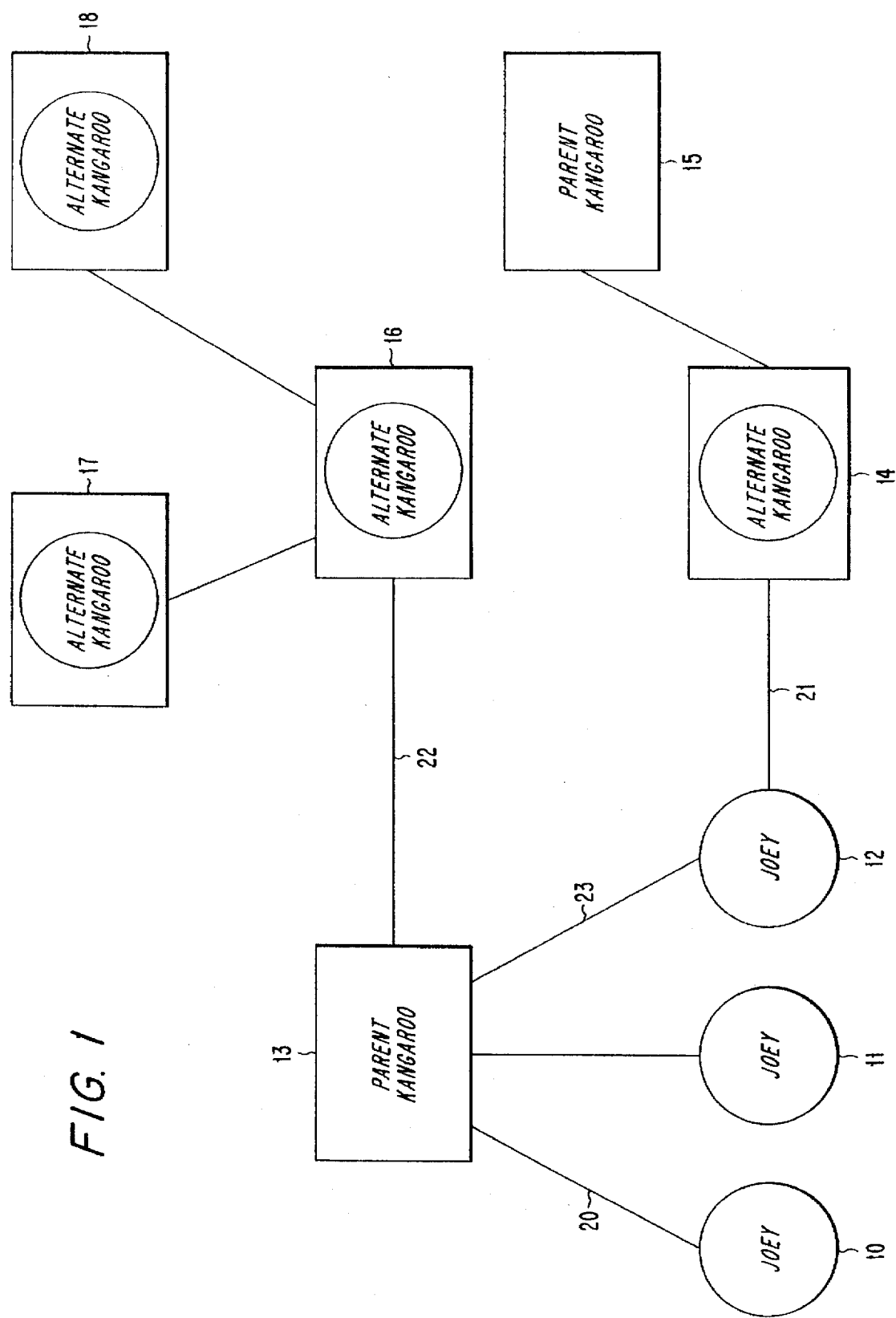
FIG. 1 illustrates a representative network structure according to the present invention.

According to the present invention, as embodied and broadly described herein, an on-line database updating network and method is provided.

This document describes a system and method for a self updating database network. However, it is possible and intended that the technology described herein may also be applied to non-database systems and software such as operating systems, operating system implementations, operating system add-ons, i.e., "extensions" for MACINTOSH™, or "Modules" for WINDOWS™, software applications, software implementations and add-ons, application documents or files, and related applications.

As used herein, the term "folder", which is platform-specific to APPLE MACINTOSH™ computers, is used representatively and is meant to include any equivalent cross-platform counterparts such as directory, sub-directory, etc. Similarly, the term "desktop" is used representatively for purposes of illustration and is intended to include equivalent counterparts in different platforms.

As used in this document, the word "materials" may be defined as, but is not limited to, materials documentation including raw ingredients, processing, manufacturing, recycling, resources, chemistry, de-manufacturing, industry associations, alternatives, etc. Also, the word may be replaced with other fields of study or research such as psychology, medicine, or chemistry and may include associated subcategories/specialties respectively within the relevant field.

The present invention comprises a communications network having a communications channel, a user terminal, and a host terminal. The user terminal includes user-connecting means, user-memory means, user-input means, user-display means and user-processor means. The user terminal may, but is not required to, also include user-communications means.

The user-connecting means is connected between the communications channel and the user-processor means. The user-memory means is connected to the user-processor means. The user-input means is connected to the user-processor means. The user-display means is connected to the user-input means and to the user-processor means. If user-communications means were used, the user-communications means may be connected between the communications channel and the user-connecting means. Alternatively, the user-communications means may be integral to the user-processor means as is well known in the art.

The user-connecting means connects the user terminal to the communications channel. The user-memory means stores a plurality of user modules in a modules folder; each user module includes a plurality of user module blocks of information. The user-input means inputs user identification data and other data to the user terminal. The user-processor means processes user input data, scanning the user-connecting means, and accessing the communications channel. The user-display means is for displaying messages and screens to the user. The user-communications means, if included, is for sending user information and data from the user terminal to a remotely located host terminal over the communications channel.

The user-display means may be embodied as a display. The user-connecting means may be embodied as a data port, a serial port, or equivalent. The user-memory means may be embodied as a memory. The user-input means may be embodied as a keyboard, a voice-activated input device, or equivalent input structure. The user-communications means may be embodied as a modem. The user-processor means may minimally be embodied as an INTEL PENTIUM™ chip, INTEL™ 80486 chip, a MOTOROLA™ 68000 chip, or any equivalent processor. An upgraded processor may be used if higher level operations are desired or if the updating procedure is to performed as a background operation. More specifically, although reference is made to specific processors within this document, these references are for example only and cannot reflect the dynamic nature of the state-of-the-art. Instead, these references are only provided to convey that the minimal processor embodiment to allow the updating method to occur transparently "in the background", i.e., without the user's knowledge or input, would be any processor or system of processors which allows for "preemptive multi-tasking" as opposed to co-operative multi-tasking which requires top-level software/applications to give permission to any secondary or background software to allow such secondary or background software to command processor time.

The host terminal includes host-connecting means, host memory means, and host-processor means. Optionally, the host terminal also may include host-communications means, host input means, and host-display means.

The host-connecting means is connected between the communications channel and the host-processor means. The host memory means is connected to the host-processor means. If included, the host-communications means may be connected between the communications channel and the host-connecting means. Alternatively, the host-communications means may be integral to the host-processor means as is well known in the art. The host input means and the host-display means, if included, are connected to the host-processor means and to each other.

The host-connecting means is for connecting the host-processor means to the communications channel. The host memory means is for storing a plurality of host modules; each host module includes a plurality of host module blocks of information. The host module blocks of information may include non-updated host-module blocks of information and updated host-module blocks of information. As used in this application, a host module block of information is an "updated" block if it has an origin date more recent than an origin date of a corresponding user module block of information.

The host-processor means processes user identification data and other data received from the user terminal, and directs the transmission of host module blocks of information to the user terminal. The host-communications means receives user information data and other data sent from a remotely-located user terminal to the host terminal using the communications channel. The host-communications means also sends host data from the host terminal to the remotely-located user terminal using the communications channel. The host input means, if included, inputs data to the host terminal. The host-display means, if included, displays messages and screens to a user.

The host-connecting means may be embodied as a data port, a serial port, or equivalent. The host memory means may be embodied as a memory. The host-processor means may be minimally embodied as an INTEL PENTIUM™ 80486 chip, INTEL™ chip, a MOTOROLA™ 30386 chip, or any equivalent processor. An upgraded processor may be used if higher level operations are desired or if the updating procedure is to be performed as a background operation. More specifically, although reference is made to specific processors within this document, these references are for example only and cannot reflect the dynamic nature of the state-of-the-art. Instead, these references are only provided to convey that the minimal processor embodiment to allow the updating method to occur transparently "in the background", i.e., without the user's knowledge or input, would be any processor or system of processors which allows for "preemptive multi-tasking" as opposed to co-operative multi-tasking which requires top-level software/applications to give permission to any secondary or background software to allow such secondary or background software to command processor time. The host-communications means may be embodied as a modem. The host input means, if included, may be embodied as a keyboard, a voice-activated activated input device, or equivalent. The host-display means, if included, may be embodied as a display.

In use, a user inputs user identification data to the user terminal using a user input device. In response to the user identification data, the user processor scans the user memory for user modules in the modules folder. In response to locating a user module having a user origin date, the user processor scans a data port for a host terminal. In response to finding a host terminal, the user processor accesses the communications channel to connect with the host terminal. The user terminal sends user identification data and data on the user module to the host terminal.

The host terminal, operatively coupled to the user terminal through the communications channel, accepts the user identification data from the user terminal. In response to the user identification and user module data, the host processor sends, over the communications channel, a host origin date for a host module corresponding to the user module. Responsive to receiving the host origin date for the host module, the user processor retrieves the user origin date and compares the user origin date to the host origin date. In response to determining that the host origin date is more recent than the user origin date, the user processor identifies those host module blocks of information, within the host module, having origin dates more recent than corresponding user module blocks of information, within the user module, as updated blocks. The user processor then downloads to the user memory the updated blocks. Alternatively, in a secondary embodiment, the network may be configured such that, in response to determining that the host origin date is more recent than the user origin date, the user processor downloads the host module and replaces the user module with the downloaded host module.

If the user terminal and the host terminal were remotely located from one another, then the user terminal includes a user modem and the host terminal includes a host modem. After the user terminal has received user identification data and has located a user module in the modules folder, the user processor scans for a user modem. In response to finding a user modem with appropriate settings, the user processor accesses the communications channel to connect with the remotely-located host terminal. The remotely-located host terminal accepts the dialed connection through the host modem. The user module update procedure then continues in a manner equivalent to the user module update procedure followed with the local host.

The present invention may further include an alternate host terminal. The alternate host terminal comprises alternate host-connecting means, alternate host memory means, and alternate host-processor means. Optionally, the alternate host terminal may also include alternate host-communications means, alternate host input means and alternate host-display means.

The alternate host-connecting means is connected between the communications channel and the alternate host-processor means. The alternate host memory means is connected to the alternate host-processor means. If included, the alternate host-communications means may be connected between the communications channel and the alternate host-connecting means. Alternatively, the alternate host-communications means may be integral to the alternate host-processor means as is well known in the art. The alternate host input means and the host-display means, if included, are connected to the alternate host-processor means and to each other.

The alternate host-connecting means is for interfacing between the communications channel and the alternate host-processor means. The alternate host memory means is for storing a plurality of alternate host modules; each alternate host module includes a plurality of alternate host module blocks of information. The alternate host module blocks of information may include non-updated alternate host-module blocks of information and updated alternate host-module blocks of information. As used in this application, an alternate host module block of information is an "updated" block if it has an origin date more recent than a corresponding user module block of information.

The alternate host-processor means is for processing user identification data and other data received from the user terminal and for directing the transmission of alternate host module blocks of information to the user terminal. The alternate host-communications means, if included, is for accepting a connection from a remotely-located user terminal and for sending alternate host module blocks of information to the remotely-located user terminal. The alternate host input means, if included, is for inputting data to the alternate host terminal. The alternate host-display means, if included, is for displaying messages and screens to a user.

The alternate host-connecting means may be embodied as a data port, a serial port, or equivalent. The alternate host memory means may be embodied as a memory. The alternate host-processor means may be embodied as any of the processor chips previously identified in connection with the host processor means and subject to the same caveats regarding the state-of-the-art and preemptive multi-tasking requirements. The alternate host-communications means, if included, may be embodied as a modem. The alternate host input means, if included, may be embodied as a keyboard, a voice-activated input device or equivalent. The alternate host-display means, if included, may be embodied as a display.

In use with the present invention, the alternate host terminal, operatively coupled to the user terminal through the communications channel, accepts user identification data from the user terminal. In response to the user identification data and user module data received from the user terminal, the alternate host processor sends, over the communications channel, an alternate host origin date for an alternate host module corresponding to the user module. The user processor, in response to receiving the alternate host origin date for the alternate host module, retrieves the user origin date and compares the alternate host origin date for the alternate host module to the user origin date of the corresponding user module. In response to determining that the alternate host origin date is more recent than the user origin date, the user processor identifies those alternate host module blocks of information, within the alternate host module, having origin dates more recent than corresponding user module blocks of information, within the user module, as updated blocks. The user processor then downloads to the user memory the updated blocks. Alternatively, in a secondary embodiment, the network may be configured such that, in response to determining that the alternate host origin date is more recent than the user origin date, the user processor downloads the alternate host module and replaces the user module with the downloaded alternate host module.

If the user terminal and the alternate host terminal were remotely located from one another, then the user terminal includes a user modem and the alternate host terminal includes an alternate host modem. After the user terminal has received user identification data and has located a user module in the modules folder, the user processor scans for a user modem. In response to finding a user modem with appropriate settings, the user processor accesses the communications channel to connect with the remotely-located alternate host terminal. The remotely-located alternate host terminal accepts the dialed connection through the alternate host modem. The user module update procedure then continues in a manner equivalent to the user module update procedure followed with the local alternate host.

The present invention also may be embodied as a method for updating databases using a network including a user terminal, a host terminal, and a communications channel. The network may further include an alternate host terminal.

The user terminal includes a display, an input device, a user data port, and a user terminal memory for storing user modules of grouped information in a modules folder. The host terminal includes a data port and a host terminal memory for storing host modules of grouped information.

The method of the present invention comprises the steps of activating the user terminal using the input device, scanning the modules folder in the user terminal memory for stored user modules, and locating a stored user module having a user origin date. The method further comprises the steps of locating a host terminal and connecting to the host terminal through the user data port, through the communications channel, and to the host data port. The method then includes the steps of scanning the host terminal memory for stored host modules, and locating a stored host module corresponding to the stored user module and having a host origin date. The method then comprises the steps of retrieving from the user terminal memory the user origin date and comparing, by the user terminal, the user origin date and the host origin date. The method then downloads the stored host module into the user terminal memory in response to the host origin date being more recent than the user origin date, and replaces the stored user module with the more recent stored host module and the host origin date.

In response to the host origin date being more recent than the user origin date, the method may further comprise the steps of scanning, by the user processor, the stored user module for a plurality of user-module-block origin dates, and scanning the stored host module for a plurality of host-module-block origin dates. The plurality of user-module-block origin dates correspond with a plurality of user module blocks, respectively. Each user module of grouped information may be subdivided into such a plurality of user module blocks, each of which blocks may be updated, deleted, moved, or left unchanged, independently of the remaining plurality of user module blocks. Similarly, the plurality of the host-module-block origin dates correspond with a plurality of host module blocks, respectively.

Each host module of grouped information may be subdivided into such a plurality of host module blocks, each of which blocks may be updated, deleted, moved or left unchanged, independently of the remaining plurality of host module blocks.

The method further comprises the steps of comparing the plurality of user-module-block origin dates to the corresponding plurality of host-module-block origin dates, respectively, and downloading only those host module blocks within the stored host module having host-module-block origin dates more recent than user-module-block origin dates of respective user module blocks within the stored user module, as updated blocks. Using these method steps, only host module blocks which have been updated relative to corresponding user module blocks are downloaded over the communications channel to the user terminal memory as updated blocks. Host module blocks having host-module-block origin dates older than corresponding user-module-block origin dates are not downloaded.

In addition to downloading updated blocks, the user terminal can also identify new host-module blocks. A "new" host-module block is a host module block having no corresponding user-module block within the plurality of user module blocks. The method of the present invention further comprises the steps of downloading new host-module blocks into the user memory as updated blocks.

The method further comprises the steps of scanning the modules folder in the user terminal memory for additional stored user modules, and locating an $n^{th}$ stored user module having an $n^{th}$ user origin date. The method further comprises the steps of locating an $n^{th}$ host module, corresponding to the $n^{th}$ user module, and having an $n^{th}$ host origin date. The method then comprises the steps of retrieving from the user terminal memory the $n^{th}$ user origin date and comparing, by the user terminal, the $n^{th}$ user origin date and the $n^{th}$ host origin date. In response to the $n^{th}$ host origin date being more recent than the $n^{th}$ user origin date, the method then includes the steps of downloading the $n^{th}$ host module into the user terminal memory and replacing the $n^{th}$ user module with the more recent $n^{th}$ host module and $n^{th}$ host origin date.

In response to the $n^{th}$ host origin being more recent than the $n^{th}$ user origin date, the method may further comprise the steps of scanning the $n^{th}$ host module for $n^{th}$ host module blocks having origin dates more recent than corresponding $n^{th}$ user module blocks as updated blocks, and downloading the updated blocks.

Reference now is made in detail to the present preferred embodiments of the invention, examples of which are illustrated in the accompanying drawings, wherein like reference numerals indicate like elements throughout the several views.

As illustratively shown in FIG. 1, the communications network of the present invention includes, by way of example, user terminals called Joeys 10, 11, 12, host terminals called Parent Kangaroos 13, 15, and alternate host terminals called Alternate Kangaroos 14, 16, 17, 18.

The terminology of "Joeys" and "Kangaroos" is employed to convey the mobile nature of a user engaged in research using the network of the present invention. Kangaroos are mobile creatures and move from one area to another in search of food or other needs. A user terminal, i.e., Joey, is also "mobile" in the sense that the Joey can "travel" through the network in search of research data which can be gathered from any number of different host locations, i.e., Kangaroos.

A Joey is an individual user of the Kangaroo software who does not support other Joeys with information. A Joey can modify its own on-site databases, and can hop to Alternate Kangaroos to gather custom specific database information for the Joey's desktop. A Joey can also forward or upload new or updated information to its Parent Kangaroo's free archives.

Each host terminal, or Parent Kangaroo, has two sections. The first section, here referred to as the "free archives", contains unconfirmed information. The second section, here referred to as the "library", contains confirmed information. A Parent Kangaroo 13 supports or feeds information and program updates to the Joeys 10, 11, 12 which are connected to it. A Parent Kangaroo owns sample collections and can lend these sample collections to Joeys and to other Kangaroos when a sample request is received. Parent Kangaroos can be located at local libraries, schools, and at regional offices of industrial associations. For each Joey, a Parent Kangaroo is selected according to location; the Kangaroo nearest a particular Joey will become that Joey's Parent Kangaroo upon registration into the network.

Alternate Kangaroos, like Parent Kangaroos, own sample collections, and support and feed information and program updates to Joeys. Each Alternate Kangaroo has two sections. The first section, the "free archives", contains unconfirmed information. The second section, the "library", contains confirmed information. Alternate Kangaroos may be distinguished from Parent Kangaroos, however, in that Alternate Kangaroos contain and maintain specific databases and samples related to their particular specialty. For example, G. E. Plastics would be an Alternate Kangaroo providing specialized information related to plastics. Any person, association, or business considered by its peers to be an authority in a given area of expertise can become an Alternate Kangaroo.

As shown by the graphic depiction in FIG. 1, Alternate Kangaroos have a hybrid status in which they may sometimes act as Joeys and at other times act as Parent Kangaroos. This hybrid status is reflected in FIG. 1 by the circle within a rectangle configuration denoting each Alternate Kangaroo and arises from the function of the Alternate Kangaroos.

An Alternate Kangaroo acts both as a Joey and as a Parent Kangaroo, depending upon user needs. For example, Alternate Kangaroo 14 is a "Joey" to Parent Kangaroo 15. As a "Joey", a user enters user identification data, using a user-input device, into Alternate Kangaroo 14. As with any "Joey", the display of Alternate Kangaroo 14 is used to convey messages and screens to the user. At the same time, Alternate Kangaroo 14 fulfills Parent Kangaroo-type functions as an Alternate Kangaroo to Joey 12. Similarly, Alternate Kangaroo 16 can act as both a pseudo-Parent Kangaroo to Alternate Kangaroos 17, 18, and as a Joey to Alternate Kangaroos 17, 18. Alternate Kangaroo 16 may act as a Joey to Parent Kangaroo 13 and may also act as an Alternate Kangaroo to the Parent Kangaroo 13. Each Joey 10, 11, 12 is connected to a Parent Kangaroo 13. A Joey may also be connected to an Alternate Kangaroo 14. Additional Alternate Kangaroos may also be subscribed to by any given Joey.

In use of a network such as that depicted in FIG. 1, a user activates the Joey 12 by inputting user identification data. In response to the user identification data, the Joey 12 scans the modules folder in the Joey's memory for a stored user module. Upon locating, responsive to scanning the modules folder, a first stored user module having a first user origin date, the Joey scans the Joey's data port for the Parent Kangaroo 13. Locating the Parent Kangaroo 13, the Joey connects through the communications channel 23 to the Parent Kangaroo 13. The Joey then scans the Parent Kangaroo's memory for stored host modules. Upon locating a stored host module corresponding to the first stored user module in the Joey 12 and having a host origin date, the Joey 12 retrieves the first user origin date, and compares the first user origin date to the host origin date. In response to the host origin date being more recent than the first user origin date, the Joey scans the Parent Kangaroo's stored host module for host module blocks having corresponding host-module-block origin dates more recent than user-module-block origin dates of corresponding user module blocks. The Joey then downloads over the communications channel 23 those host module blocks having origin dates more recent than corresponding user module blocks as updated blocks. These downloaded updated blocks are then used to update the stored user module in the Joey 12 by replacing the older blocks. The host module blocks may be downloaded in compressed format in accordance with various compression methodologies well known in the art, and then may be decompressed following successful file transfer, as is also known in the art. The terms "compression" and/or "decompression" as used in this document refer to any method or algorithm used by a program to reduce or expand, respectively, the size in bits, bytes, kilobytes, megabytes, etc. of a file or module of information.

The method then continues with the Joey 12 scanning the alternate modules folder in the Joey's memory for a stored user module. Upon locating a second stored user module having a second user origin date in the alternate modules folder, the Joey 12 scans the Joey's data port for the Alternate Kangaroo 14. Upon locating the Alternate Kangaroo 14, the Joey connects through the communications channel 21 to the Alternate Kangaroo 14. The Joey then scans the Alternate Kangaroo's memory for a stored alternate host module. Upon locating a stored alternate host module corresponding to the second stored user module and having an alternate host origin date, the Joey retrieves the second user origin date for the second stored user module from the alternate modules folder. The Joey then compares the second user origin date to the alternate host origin date. In response to the alternate host origin date being more recent than the second user origin date, the Joey identifies those alternate host module blocks having alternate-host-module-block origin dates more recent than user-module-block origin dates of corresponding user module blocks within the second stored user module, as updated blocks. The Joey 12 then downloads over the communications channel 21 the updated blocks from the Alternate Kangaroo 14. The updated blocks are then used to update the second stored user module in the Joey's memory by replacing the older blocks. The alternate host module blocks, like the host module blocks, may be downloaded in compressed format in accordance with various compression methodologies well known in the art, and may then be decompressed following successful file transfer.

Figure 2:
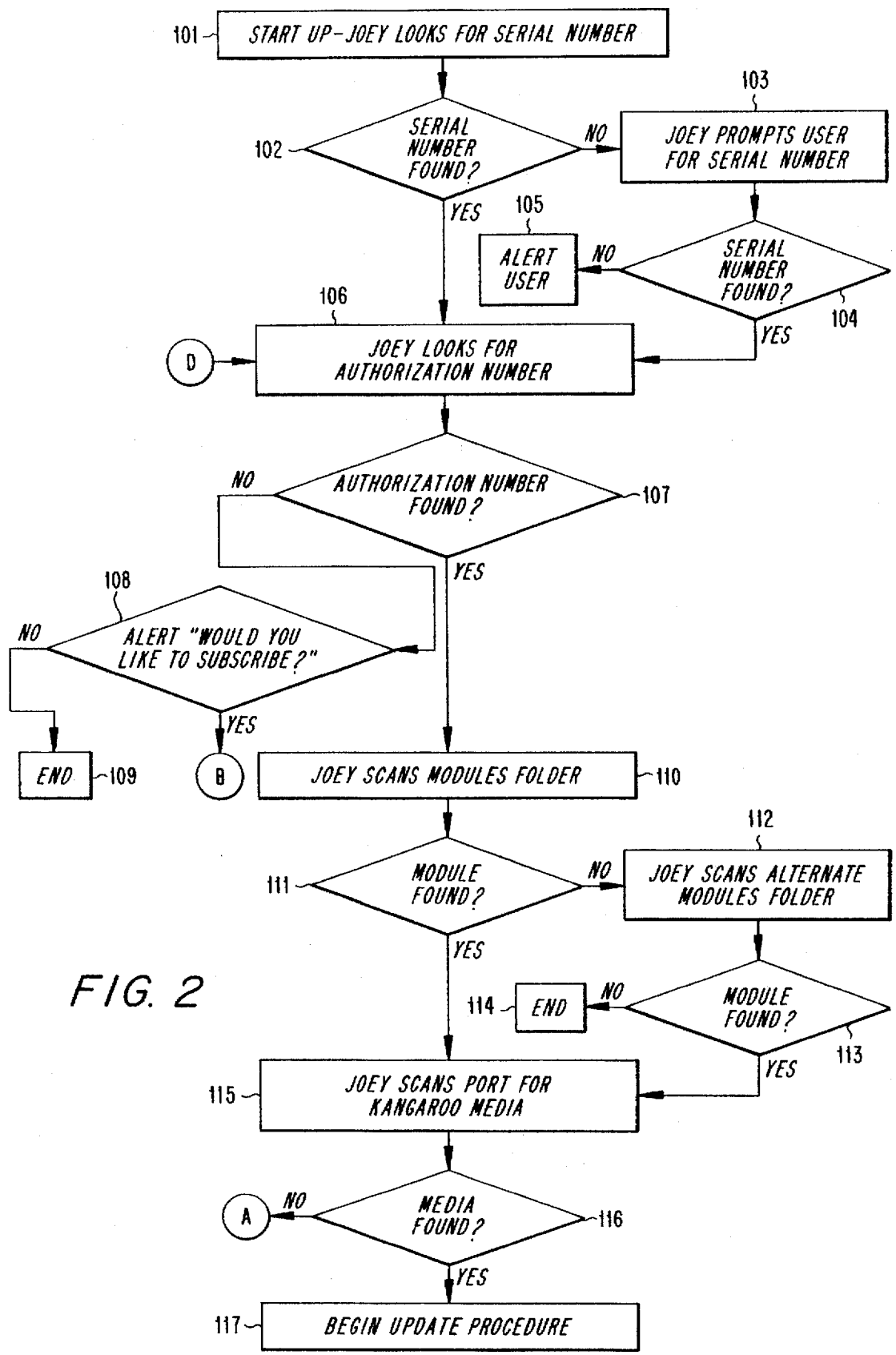
FIG. 2 depicts a flow chart of the start-up procedure and local access connection using the method of the present invention.

As depicted in FIG. 2, upon start-up a Joey looks 101 for the serial number of its Kangaroo subscription. If the serial number is not found 102, the Joey prompts 103 the user for a serial number. If the serial number is not found 104, the Joey alerts 105 the user that the serial number was not found or was in an invalid format. If a serial number is found 104, the Joey looks 106 for an authorization number. If an authorization number is not found 107, the Joey alerts 108 the user with a message asking the user if the user would like to subscribe to the Kangaroo network. If the user chooses to subscribe, the method continues as set forth in FIG. 4. If the user does not wish to subscribe, the start-up procedure ends 109.

Returning to the Joey's search for an authorization number, if an authorization number is found 107, the Joey scans 110 the modules folder in the Joey's memory. If a module is not found 111, the Joey scans 112 the alternate modules folder. If a module is not found 113 in the alternate module folder, the start-up process ends 114. If a module is found in the modules folder 111 or in the alternate modules folder 113, the Joey scans 115 a user terminal port for Kangaroo media. If Kangaroo media is not found 116, the method continues as set forth in FIG. 3. If Kangaroo media is found 116, the Joey begins 117 the update procedure.

In response to the Joey scanning the user terminal port for Kangaroo media 115 and finding 116 Kangaroo media, the method continues as set forth in FIG. 3. The Joey scans 120 the user terminal port for a modem. If a modem is not found 121, the Joey alerts 122 the user that a modem is required to use the Kangaroo network. If there were no modem, then the process for connecting the Joey to the Kangaroo network ends 123. If a modem were found 121, then the Joey scans 124 the modem for modem settings. If modem settings were not found 125, then the Joey alerts 126 that modem settings must be determined. The Joey then opens 127 a modem settings dialog box. In response to the modem settings dialog box, the user inputs 128 modem settings.

Once modem settings are found 125, the Joey gets 129 an area code from the modem settings and scans for a match in the host Kangaroo's folder. If a match were not found 130, then the Joey directs 131 the user to connect to the Kangaroo network using a specified telephone number such as 1-800-ROO-SERV. The number, 1-800-ROO-SERV, is used herein as a representative number for purposes of example only and may not refer to an actual number currently in use. If a telephone connection were not confirmed 132, then the Joey retrys 133 to connect to 1-800-ROO-SERV. If after retrying, a connection were not confirmed 134, then the Joey alerts 135 the user that the Joey could not contact the Kangaroo. The process for connecting to the Kangaroo network then ends 136. If at any time after connecting to 1-800-ROO-SERV, a connection were confirmed 132, 134, then the Joey begins 143 the update procedure.

If when scanning 129 for a match in the host Kangaroo's folder, the Joey found 130 a match, the Joey then directs 137 the modem to dial the local Kangaroo. If a connection were not confirmed 138, then the Joey retrys 139 to make a connection with the local Kangaroo. If a connection were not confirmed 140, then the Joey directs the modem to connect to the Kangaroo network using 1-800-ROO-SERV. If a telephone connection were not confirmed 142, then the Joey retrys 133 to make a connection to 1-800-ROO-SERV. If a connection were not confirmed 134, then the Joey alerts 135 the user that the Joey could not contact the Kangaroo. The process for connecting to the Kangaroo network will then end 136. If, however, a connection were confirmed 134, 142, 138, then the Joey begins 143 the update procedure.

Figure 4:
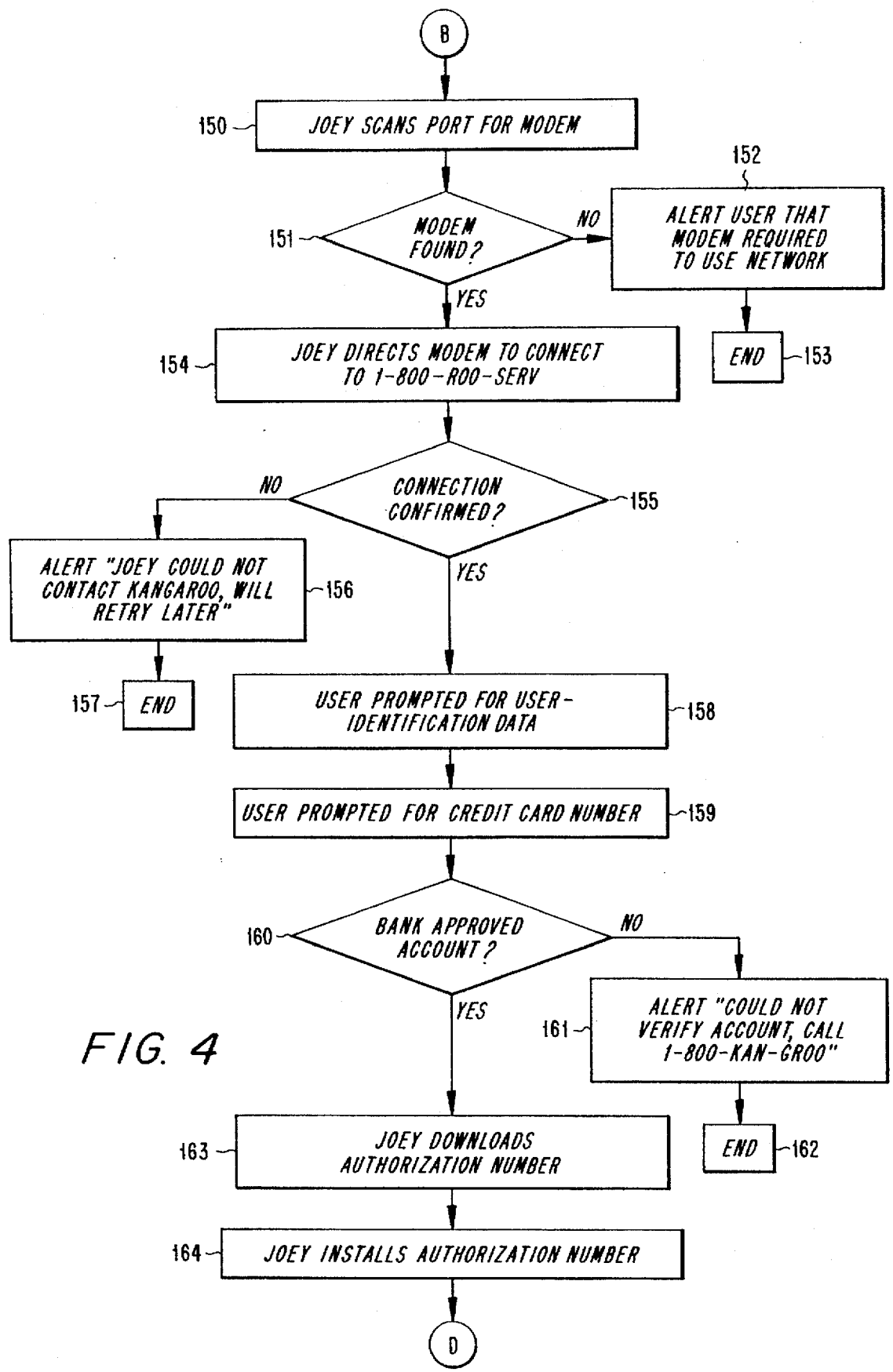
FIG. 4 depicts a flow chart of the registration procedure for access to the network of the present invention.

FIG. 4 depicts the user registration process. If during the start-up procedure the Joey were not successful in finding an authorization number, then the Joey alerts 108 the user and asks if the user would like to subscribe to the Kangaroo network. In response to an indication from the user that the user wishes to subscribe, the Joey scans 150 the user terminal port for a modem. If a modem were not found 151, then the Joey alerts 152 the user that a modem is required to use the network. The process for connecting to the Kangaroo network then ends 153. If a modem were found 151, then the Joey directs 154 the modem to connect to 1-800-ROO-SERV. If a connection is not confirmed 155, the Joey alerts 156 the user that the Joey could not contact the Kangaroo and will retry later. The process for connecting to the Kangaroo network then ends 157.

If a connection were confirmed 155, then the Joey prompts 158 the user for user-identification data. User identification data may include the user's full name, the user's company name, the user's address, the user's phone number, the user's fax number, and the user's e-mail address. The Joey then prompts 159 the user for a credit card number. If the bank did not approve 160 the account number provided by the user, then the Joey alerts 161 the user that the Joey could not verify the account. The user is then instructed to call a specified telephone number such as 1-800-KAN-GROO. The number, 1-800-KANGROO, is used herein as a representative number for purposes of example and may not refer to an actual number currently in use. The process for connecting to the Kangaroo network then ends 162. If the bank approved 160 the account number provided by the user, then the Joey downloads 163 the authorization number and then installs 164 the authorization number. Once the authorization number is installed 164, the method continues as set forth in FIG. 2 with the Joey scanning 110 the modules folder, finding 111 a module, scanning 115 the user terminal port for Kangaroo media, finding 116 media, and beginning 117 the update procedure.

Figure 5:
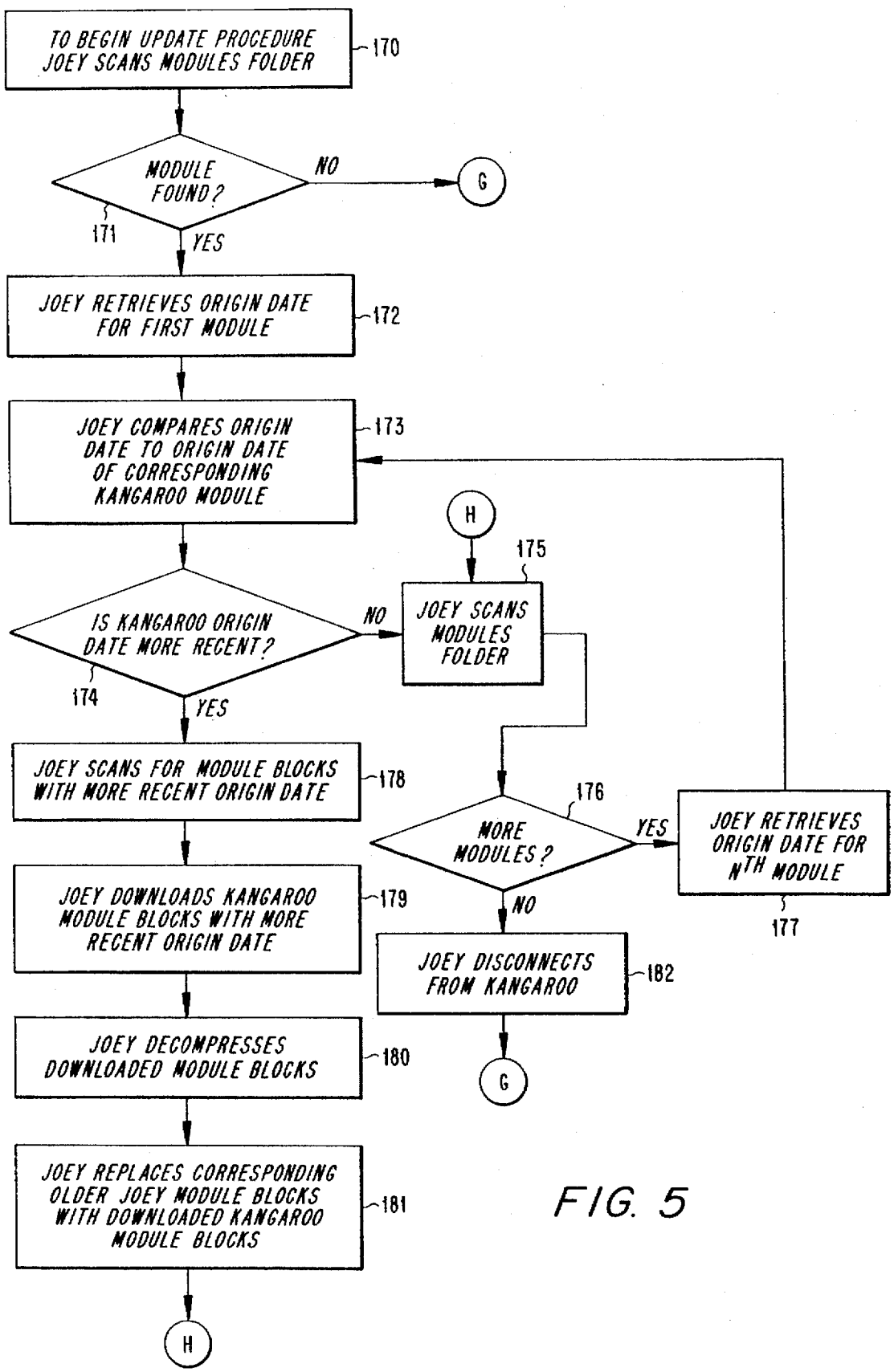
FIG. 5 depicts a flow chart of the update procedure between host and user terminals using the method of the present invention.
Figure 6A:
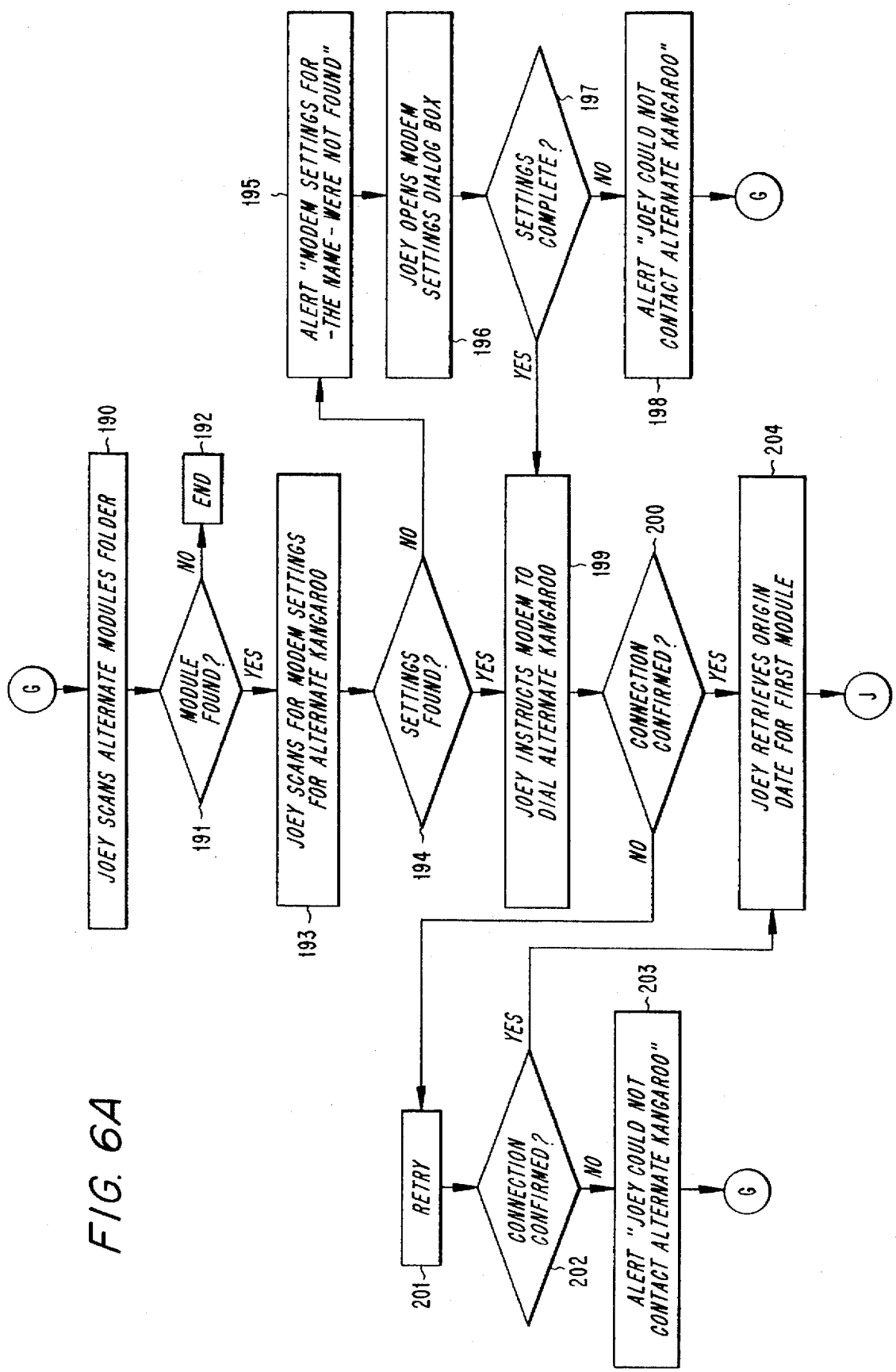
FIG. 6 depicts a flow chart of the update procedure between alternate host and user terminals using the method of the present invention.
Figure 6B:
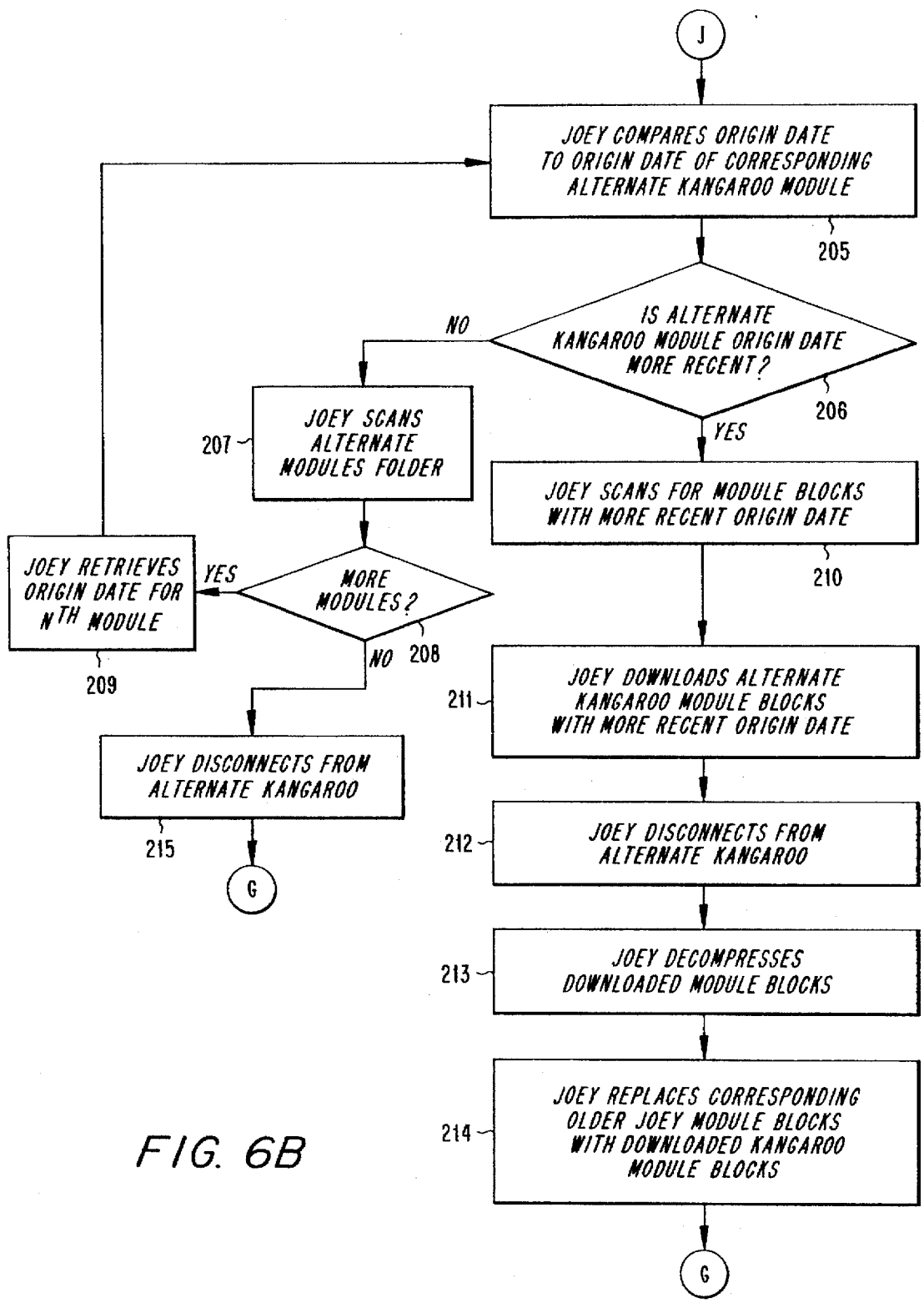

FIGS. 5 and 6 depict flow diagrams of the update procedure. Looking to FIG. 5, to begin the update procedure the Joey scans 170 the modules folder in the Joey's memory. If a module were not found 171, then the method continues as set forth in FIG. 6. If a first module were found 171, then the Joey retrieves 172 the origin date for the first module. The Joey then compares 173 the retrieved origin date retrieved to the origin date of a corresponding Kangaroo module. If the Kangaroo origin date were not more recent 174 than the origin date of the first module, then the Joey scans 175 for more modules. If more modules were not found 176, then the Joey disconnects 182 from the Kangaroo. The method then continues as set forth in FIG. 6.

If more modules were found 176, then the Joey retrieves 177 an origin date for the next module. The Joey then compares 173 the origin date of the next module to an origin date of a corresponding Kangaroo module. If the Kangaroo origin date were not more recent 174 than the origin date of the next module, then the Joey again searches for more modules and repeats the steps of retrieving 177 an origin date and comparing 173 that retrieved date to an origin date of a corresponding Kangaroo module for all remaining modules found. If the Kangaroo origin date were more recent 174 than the origin date of the Joey module being compared, then the Joey scans 178 for module blocks within the Kangaroo module having a more recent origin date than the origin date of the Joey module being compared. The Joey downloads 179 those Kangaroo module blocks having a more recent origin date than the origin date of corresponding Joey module blocks. The Joey then decompresses 180 the downloaded blocks, if these blocks were downloaded in a compressed format, and replaces 181 the corresponding older Joey module blocks with the downloaded Kangaroo module blocks.

After the first module has been updated, the Joey then scans 175 the modules folder for more modules. If more modules were not found 176, then the Joey disconnects 182 from the Kangaroo. The method then continues as set forth in FIG. 6. If more modules were found 176, then the Joey repeats the steps of retrieving an origin date 177 for the module found, comparing 173 the origin date to an origin date of a corresponding Kangaroo module, scanning 178 for module blocks having an origin date more recent than an origin date of corresponding Joey module blocks, downloading 179 those Kangaroo module blocks having an origin date more recent than the origin date of corresponding Joey module blocks, decompressing 180 the downloaded blocks, and replacing 181 older Joey module blocks with the downloaded Kangaroo module blocks.

Once the Joey has scanned the modules folder and has updated all modules found, the method continues as set forth in FIG. 6 with the Joey scanning 190 the alternate modules folder. If a module were not found 191 in the alternate modules folder, then the process for connecting to the Kangaroo network ends 192. If a module were found 191 in the alternate modules folder, then the Joey scans 193 from modem settings for an Alternate Kangaroo. If modem settings were not found 194, then the Joey alerts 195 the user that modem settings for the Alternate Kangaroo were not found. The Joey then opens 196 a modem settings dialog box. If in response to the modem settings dialog box the settings were not complete 197, then the Joey alerts 198 the user that the Joey could not contact the Alternate Kangaroo. The Joey then continues to scan 190 the alternate modules folder for modules within additional Alternate Kangaroos to which the Joey may subscribe. If no module were found 191 within an additional Alternate Kangaroo, the update process ends 192. If a module were found 191 within an additional Alternate Kangaroo, the Joey repeats the sequence of steps as set forth in FIG. 6 for contacting and updating from the additional Alternate Kangaroo. As desired by the user, the process repeats until contact has been completed or attempted for all Alternate Kangaroos to which the Joey subscribes.

If, in response to the modem settings dialog box, the settings were complete 194, 197 then the Joey instructs 199 the modem to dial the Alternate Kangaroo. If a connection were not confirmed 200, then the Joey retries 201 to make a connection with the Alternate Kangaroo. If after retrying the connection were not confirmed 202, then the Joey alerts 203 the user that the Joey could not contact the Alternate Kangaroo. The Joey then continues scanning 190 the alternate modules folder for modules within additional Alternate Kangaroos to which the Joey may subscribe. If no module were found 191 within an additional Alternate Kangaroo, the update process ends 192. If a module were found 191 within an additional Alternate Kangaroo, the Joey repeats the sequence of steps as set forth in FIG. 6 for contacting and updating from the additional Alternate Kangaroo. As desired by the user, the process repeats until contact has been completed or attempted for all Alternate Kangaroos to which the Joey subscribes.

If a connection were confirmed 200, 202, then the Joey retrieves 204 an origin date for the first module. The Joey then compares 205 the origin date of the first module to an origin date of a corresponding Alternate Kangaroo module. If the Alternate Kangaroo's module did not have an origin date more recent 206 than the origin date of the Joey's module, then the Joey scans 207 the alternate modules folder for more modules. If more modules were not found 208 then the Joey disconnects 215 from the Alternate Kangaroo. The Joey then scans 190 the alternate modules folder for modules within additional Alternate Kangaroos to which the Joey may subscribe. If no module were found 191 within an additional Alternate Kangaroo, the update process ends 192. If a module were found 191 within an additional Alternate Kangaroo, the Joey repeats the sequence of steps as set forth in FIG. 6 for contacting and updating from the additional Alternate Kangaroo. As desired by the user, the process repeats until contact has been completed or attempted for all Alternate Kangaroos to which the Joey subscribes.

If more modules were found 208, then the Joey retrieves 209 an origin date for the next module found. The Joey then compares 205 the origin date for the next module found to an origin date of a corresponding Alternate Kangaroo module. If the Alternate Kangaroo module's origin date were not more recent than the origin date of the next module 206 then the Joey continues to scan 207 for more modules, to retrieve 209 origin dates for additional modules found, and to compare 205 origin dates for additional modules found to corresponding Alternate Kangaroo module origin dates.

If the Alternate Kangaroo module's origin date were more recent then the origin date of the Joey's module 206, then the Joey scans 210 the Alternate Kangaroo module for module blocks within the Alternate Kangaroo module having origin dates more recent than the origin date of corresponding module blocks within the Joey's module. The Joey downloads 211 the Alternate Kangaroo module blocks having origin dates more recent than the origin date of corresponding Joey module blocks. The Joey then disconnects 212 from the Alternate Kangaroo, decompresses 213 the downloaded blocks if the blocks were downloaded in compressed format, and replaces 214 corresponding older Joey module blocks with the downloaded Alternate Kangaroo module blocks.

The sequence of steps set forth in the flow diagram of FIG. 6 is then repeated for any additional modules found within the alternate modules folder. If no additional modules are found 191, the update procedure ends 192.

Figure 7:
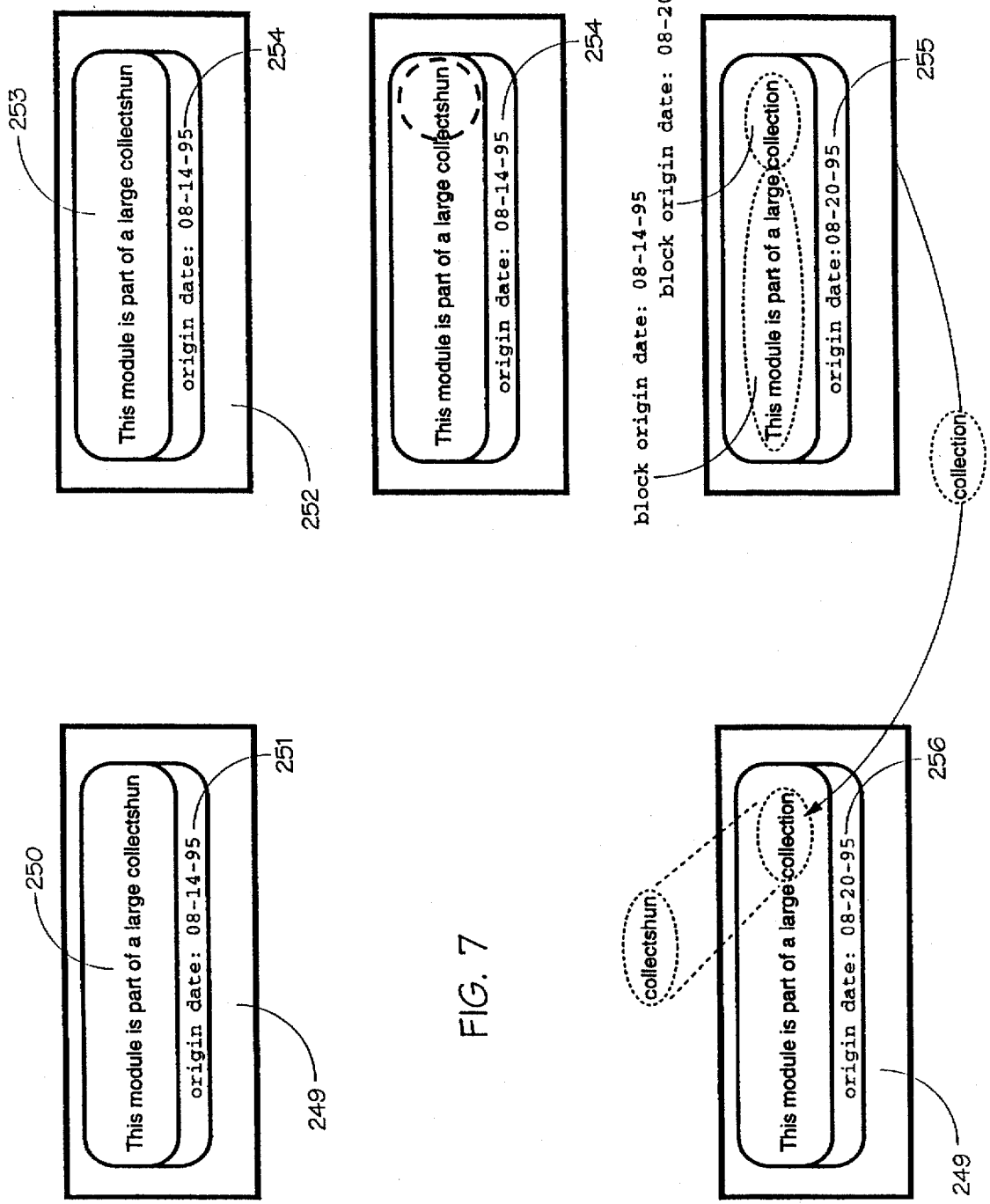
FIG. 7 illustrates an example of the updating procedure of the present invention.

FIG. 7 illustrates a working example of the update procedure of the present invention. As already discussed, a module comprises a plurality of blocks, each of which blocks may be separately updated. In the example shown, the word "collectshun" may be thought of as a block within the host module 253, "This module is part of a large collectshun". Responsive to a change in the block, "collectshun" on Aug. 20, 1995, for example, the host module origin date 254 is updated to host module origin date 255. However, the blocks within the host module 253 that were not changed, "This", "module", "is", "part", "of", "a" and "large" retain the original host module origin date 254 of Aug. 14, 1995. A user terminal 249 with a user module origin date 251 of Aug. 14, 1995 accessing the host terminal 252 on Aug. 21, 1995 would download to the user module 250 only those blocks within the host module 253 having an origin date more recent than Aug. 14, 1995 which, in this example, would be only the changed block, "collection", and would then update the user module origin date 256. Such selective downloading of only updated blocks reduces bandwidth requirements and saves processing time.

Figure 8:
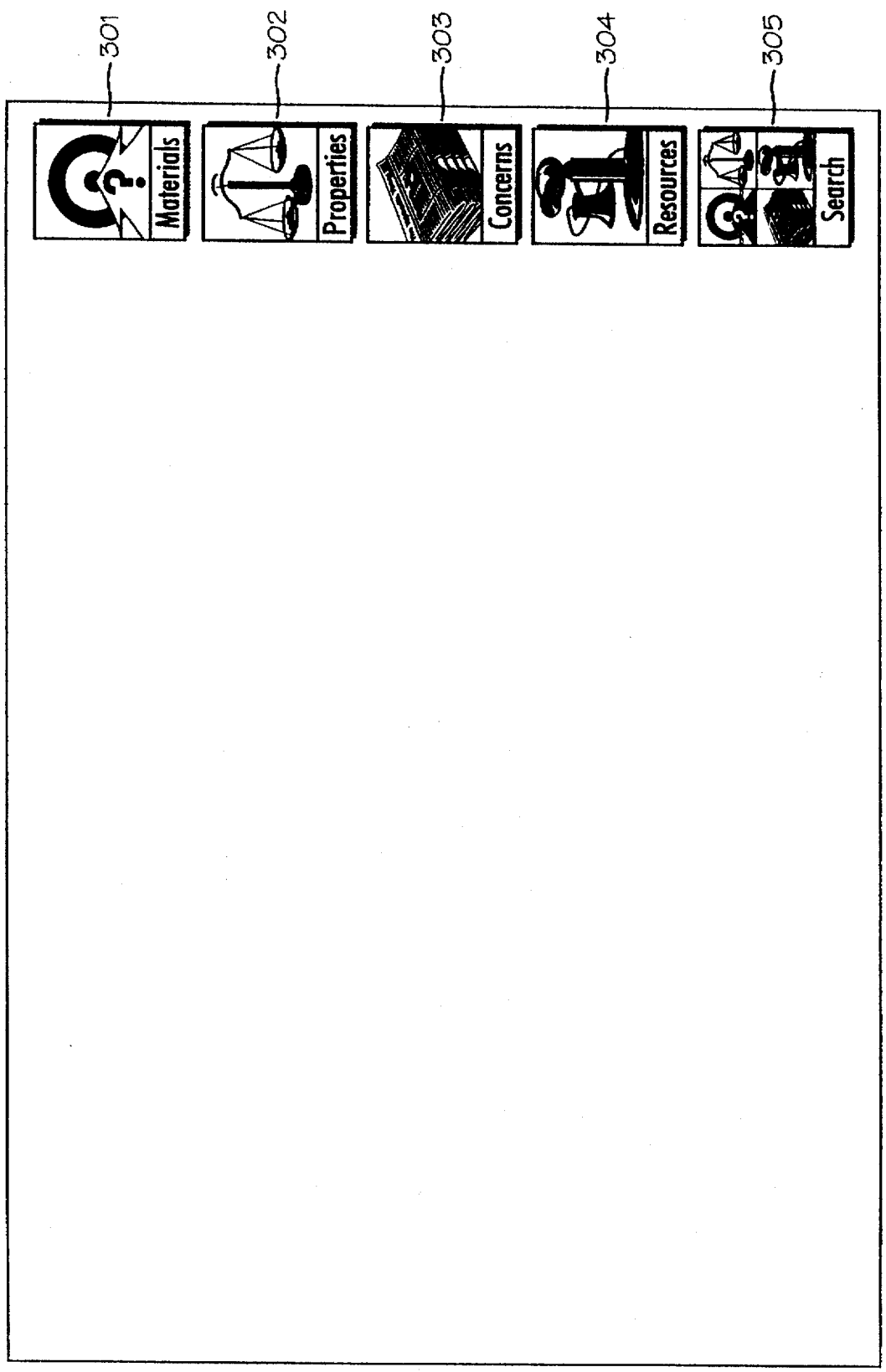
FIG. 8 depicts a representative upper-level screen display with pop-up menus.
Figure 9:
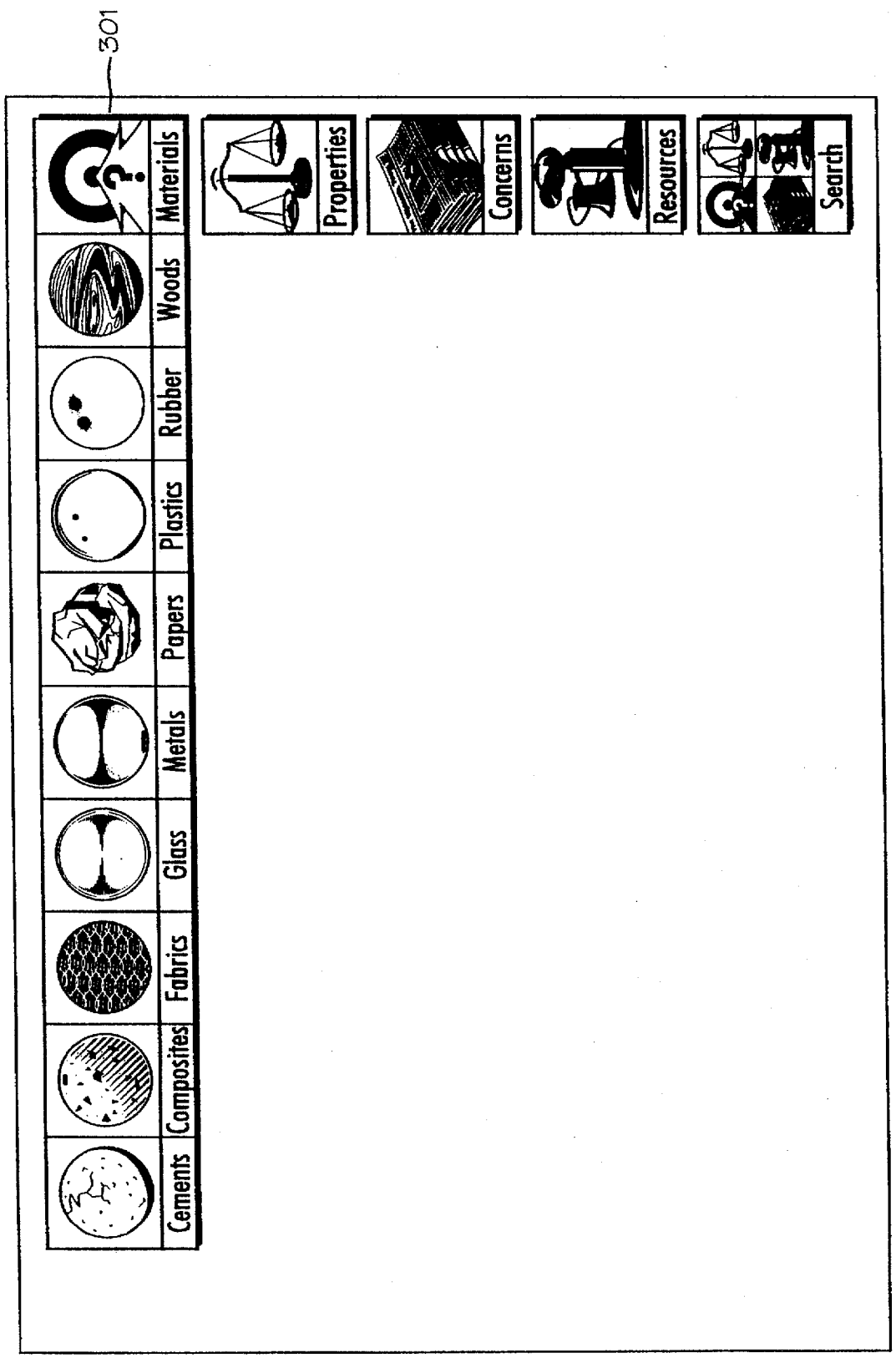
FIG. 9 depicts representative choices within a "Materials" pop-up menu.
Figure 10:
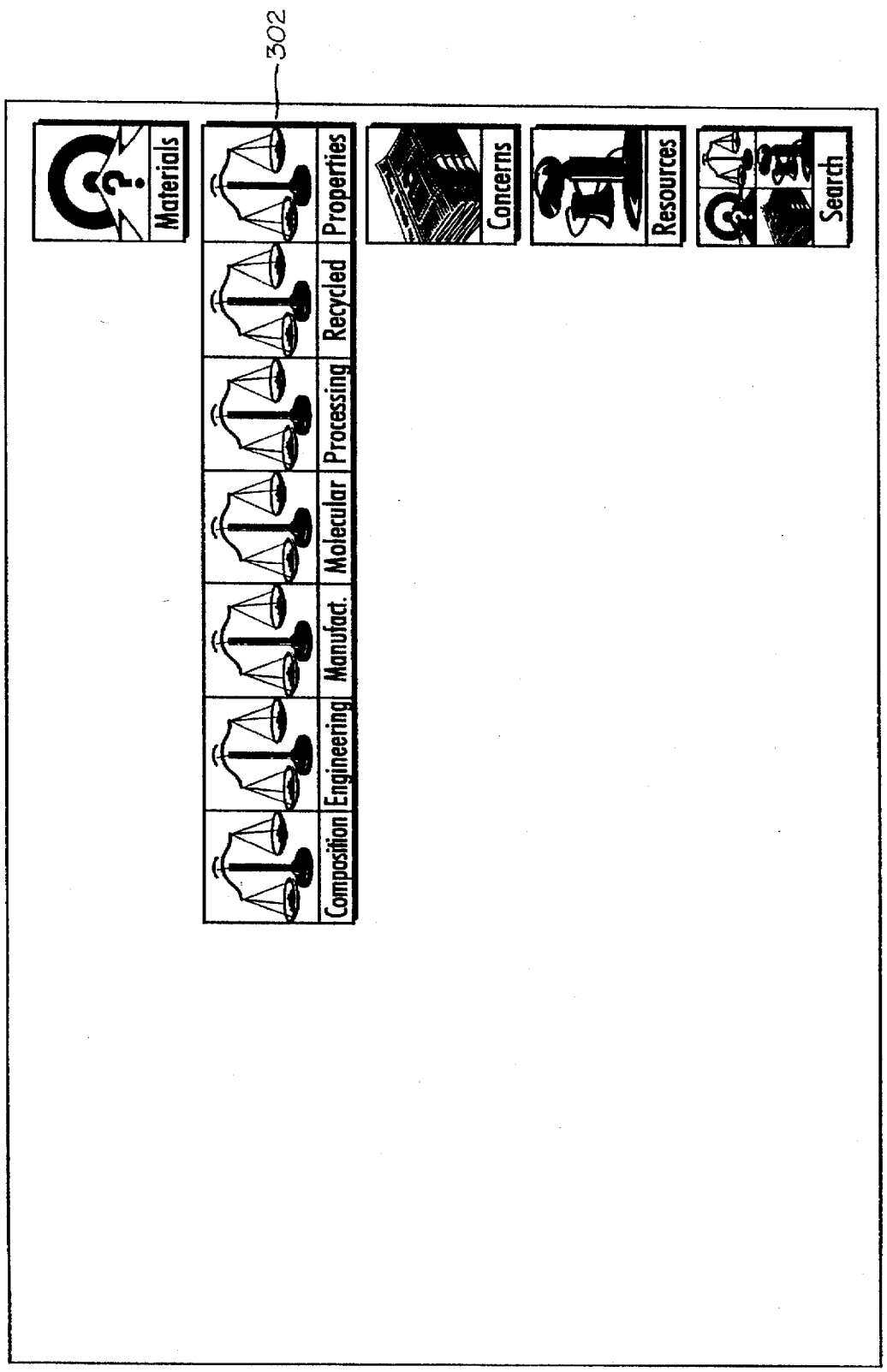
FIG. 10 depicts representative choices within a "Properties" pop-up menu.
Figure 11:
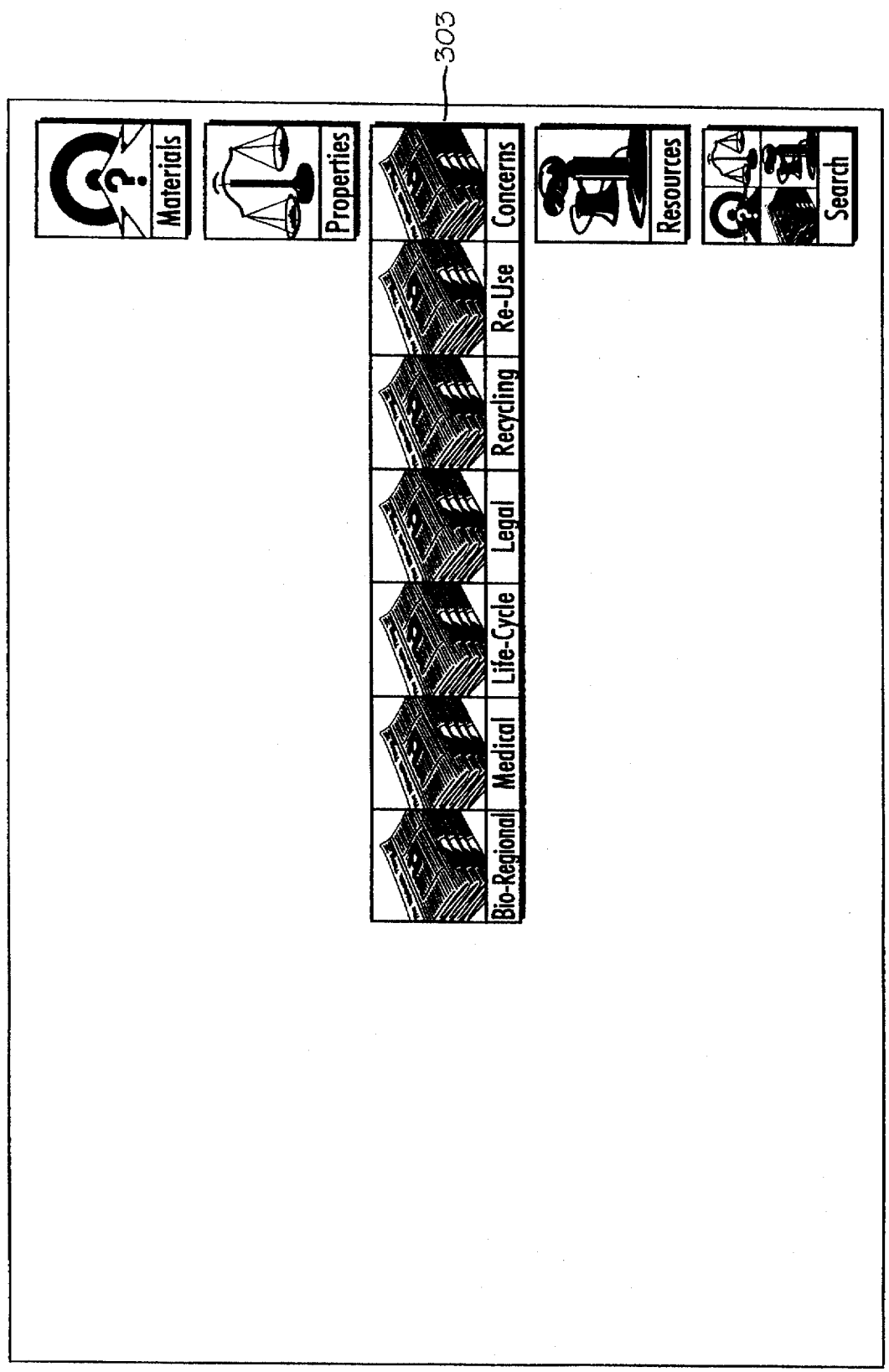
FIG. 11 depicts representative choices within a "Concerns" pop-up menu.
Figure 12:
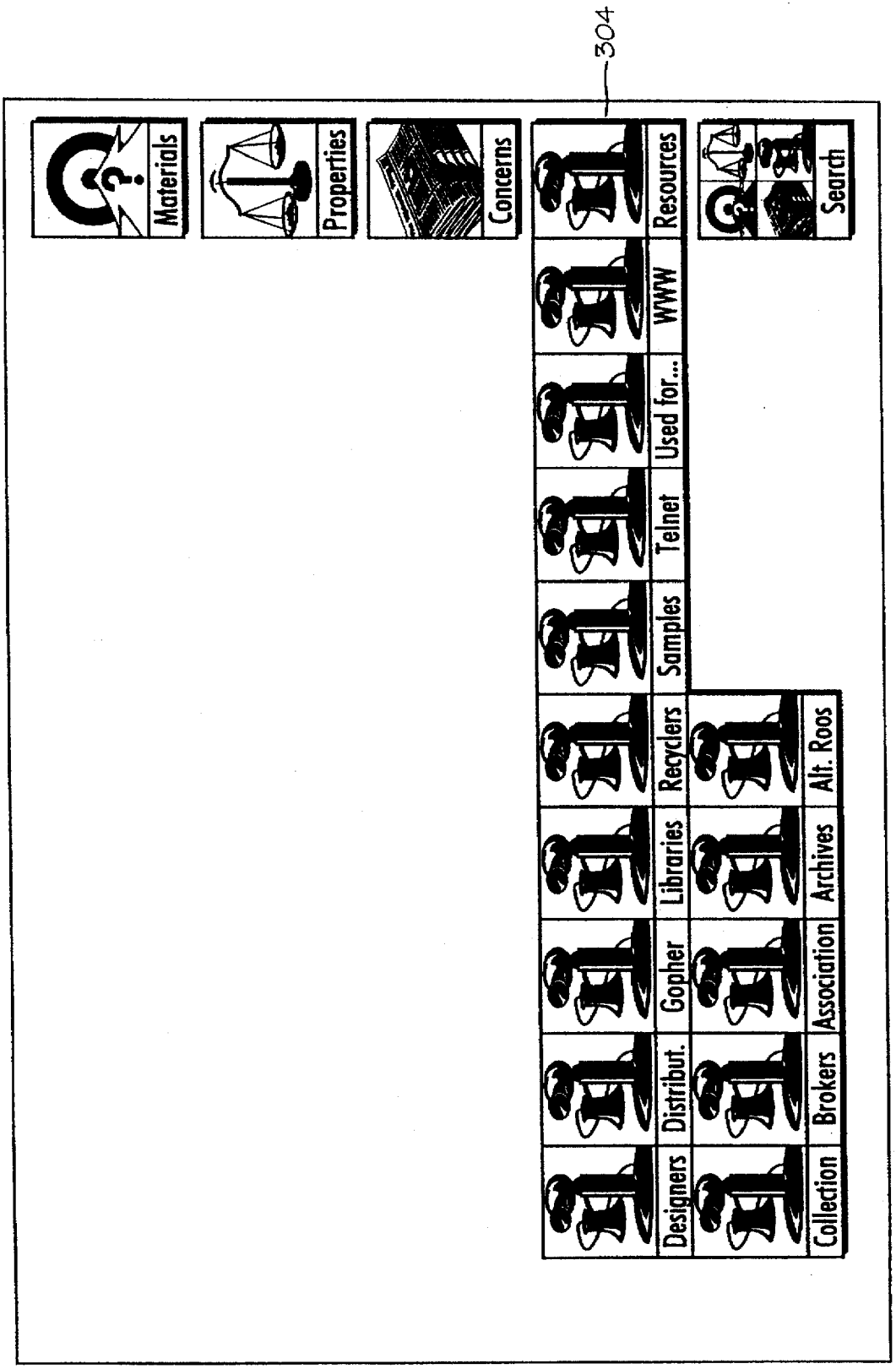
FIG. 12 depicts representative choices within a "Resources" pop-up menu.

To better illustrate the objects and advantages of the present invention, specific scenarios depicting the invention in use will be described. While the number of different screen displays that may be encountered during use of the present invention makes inclusion of all such screen displays impractical, FIGS. 8–12 provided a generalized representation of possible screen displays for purposes of illustration. FIG. 8 depicts the basic pop-up menu choices of "Materials" 301, "Properties" 302, "Concerns" 303, "Resources" 304, and "Search All" 305. Holding the mouse button down on the "Materials" 301 pop-up menu provides a listing of possible materials choices as depicted in FIG. 9. Holding the mouse button down on the "Properties" 302 pop-up menu provides a listing of possible levels and types of property characteristics as depicted in FIG. 10. Various considerations associated with a material may be further explored using the "Concerns" 303 pop-up menu to present specific selection areas as depicted in FIG. 11. Finally, FIG. 12 provides a representative categorization of resources selectable using the "Resources" 304 pop-up menu. As can be seen from these representative screen displays, the system and method of the present invention may be readily adapted to any number of applications and may be easily updated and supplemented within each application as new information becomes available.

Scenario 1-Industrial Design

In the first scenario, the Joey user is depicted as an industrial designer who is working on a project to design a solar powered street lamp. As part of this project, the industrial designer must specify a material from which the lamp housing will be constructed. This material could be aluminum, steel, plastic, etc. When choosing from these material choices, the industrial designer must be aware of the need to meet certain strength and hardness requirements for the street lamp application. These strength and hardness requirements are set forth by the Department of Transportation in a specialized set of codes for signs, signals, and lighting. The industrial designer may access these codes to determine the minimum tolerance for foot-pounds per square inch that a standing structure such as a solar powered street lamp must withstand to account for wind, collision, or related stress. Once a material has been selected, the industrial designer may use the network of the present invention to determine sources of supply for the chosen material. Finally the industrial designer can use the network to locate a specific manufacturer or manufacturers capable of meeting the needs of the project.

In addition to the traditional considerations just set forth, current industrial designers may also wish to determine the extent to which a chosen material may be considered to be socially and environmentally responsible. In making such a determination, the designer may consider the use of recycled material.

When considering recycled material, the industrial designer of the present scenario needs to determine whether the supply of the recycled material is capable of matching the requirements of mass production associated with the street lamp. If the recycled material cannot meet these requirements, then the industrial designer may consider alternative materials which could be used which would still have minimal environmental impact throughout the product life cycle of the street lamp.

For the purposes of this scenario, it will be assumed that the industrial designer's Joey has been registered and so has full access to all Kangaroo resources. Accordingly, the industrial designer's Joey is set up in the materials format, with additional Kangaroo subscriptions to American Aluminum, GE Plastics, U.S. E.P.A., Miles Polymers, U.S. Steel, the Library of Congress, and the Smithsonian Institution. Subscriptions may be available with or without a fee dependent upon the subscription provider.

Once the industrial designer has sketched out the street lamp and has a design concept, the designer goes to his or her computer terminal and launches the Kangaroo program. The industrial designer's first goal is to identify the minimum tolerance of foot-pounds per square inch required by the Department of Transportation of a standing structure to account for wind or collision on the side of the roadway. The industrial designer then conducts a search of the materials databases to find a common material that will satisfy the Department of Transportation's requirements. The industrial designer will then select that material having the least environmental impact. When this preliminary search is concluded, the designer will prepare a report detailing his or her research and recommendations.

Looking more specifically at the operation of the Kangaroo program once launched, the Joey scans the configuration folder and determines which databases are currently subscribed to by the Joey. The Joey then connects, using the modem, to the local Parent Kangaroo, and compares the origin dates of the Joey's databases to their counterparts at the Parent Kangaroo. If any of the origin dates at the Parent Kangaroo are newer than the corresponding origin dates of the Joey, the Joey requests a download of all new information for the respective databases from that or any other appropriate Parent Kangaroo.

Once all new information for the respective databases has been downloaded to the user Joey's memory, the designer selects "Alternate Kangaroos" from the resources pop-up palette. Selecting "Alternate Kangaroos" presents the designer with a dialog box asking whether or not the user wishes to limit the search to only a certain country or region or whether to list all available Alternate Kangaroos. For the purposes of this scenario, the industrial designer decides to limit the search to only those Kangaroos within the United States.

Once the search has been limited, a new window opens, entitled "Alternate Kangaroo" From this window the industrial designer selects "Government Organizations" from the "Types" pop-up palette. The window is then entitled "U.S. Government" and has a scrolling list of available government organization Kangaroo databases. The designer then selects, using the mouse button, the list item named "U.S. Department of Transportation".

The window is now entitled "U.S. D.O.T.", and has a welcoming screen explaining the D.O.T. Kangaroo and its contents. The screen informs the designer that he or she may subscribe to the entire D.O.T. Kangaroo, but that this is not suggested because the volume is quite large and may not be needed by anyone except a D.O.T. employee. The welcoming screen also lists different sections of the D.O.T. Kangaroo which may be subscribed to instead. The designer scrolls through this list and selects, using the mouse button, the list item named "Construction and Building Codes".

The window is now entitled "D.O.T. Construction and Building Codes", and has a welcoming screen explaining the construction and building codes Kangaroo. The welcoming screen informs the designer that he or she may subscribe to the entire construction and building codes Kangaroo, but that this is not suggested, because the volume is quite large and may not be needed by anyone except a D.O.T. contractor. The welcoming screen then lists different sections of the Kangaroo which may be subscribed to instead. The designer scrolls through this list and selects, using the mouse button, the list item named "Signs, Signals, and Lighting".

The window is now entitled "D.O.T. Codes for Signs, Signals, and Lighting", and has a welcoming screen explaining the signs, signals and lighting Kangaroo. The designer then goes to the pull-down Kangaroo menu at the top of the screen and selects "subscribe to" from the menu. A dialog box appears which tells the designer the name of the Kangaroo to which he or she is about to subscribe. From this dialog box, the designer can choose to subscribe to one of the higher level Kangaroos traversed in the search. For the purposes of this scenario, however, the designer does not need any additional databases, and so chooses the "OK" button.

The designer now has a subscription to the "D.O.T. Codes for Signs, Signals, and Lighting" Kangaroo. This subscription will keep itself up-to-date until the user unsubscribes.

After the designer clicks the "OK" button, an alert box appears on the designer's display screen that says "You have subscribed to a new Alternate Kangaroo. To use your new Kangaroo databases, close the current search window and select from your desk level resources palette. If you would like to subscribe to other databases from the current Alternate Kangaroo, continue navigating through the search window." Because, for the purposes of this scenario, the industrial designer does not need any additional databases from the Department of Transportation, the designer clicks "OK" to clear the alert box, and then the close box on the "D.O.T. Codes for Signs, Signals, and Lighting" window. The designer is then back on the desk top and selects "D.O.T. Codes" from the "Resources" pop-up palette. Alternatively, the "Resources" pull-down menu at the top of the screen may be used.

A new window opens entitled "D.O.T. Codes for Signs, Signals, and Lighting". This window has four pop-up palettes entitled "Topics", "Requirements", "Issues", and "Resources". The designer selects "Street Lamps" from the "Topics" pop-up palette. The window is now entitled "Lighting" and has four pop-up palettes entitled "Types", "Requirements", "Issues" and "Resources". The designer selects "Tolerances" from the "Requirements" pop-up palette.

The designer now reads the minimum requirements for foot-pounds per square inch and minimum shear strength requirements for a street lamp. These specifications may be selected by the designer and dragged to the "notes" icon, where the selected text will be stored for later examination and/or printing. The designer then closes the "Lighting" window.

The designer is now back on the desktop and ready to begin searching materials. The designer selects the "Search All" icon to open a "Search All" dialog box. The designer then types in the name of a material, if known, including the physical requirements and any manufacturing restrictions known to the designer. Since the designer most typically only knows physical requirements, this may be all of the information that is entered.

The designer then selects "All" from the "Search Databases" pop-up menu and then clicks the "OK" button. The "Search All" dialog box disappears, and a "List-1" window opens. This list is the result of the designer having selected "Search All". Double-clicking the mouse button on one of the materials listed in "List-1" will open an search window from the databases of the material selected. In the present scenario, instead of selecting a material, the designer returns to the "Search All" icon, and reopens the dialog box. The designer then enters the physical requirements learned from the Department of Transportation codes databases and specifies that the material must be recycled. When the designer clicks the "OK" button, the "Search All" dialog box disappears and a window entitled "List-2" appears. The "List-2" list is substantially shorter than the list presented in "List-1", because of the further requirement that the material be made of recycled substances. For the purposes of this scenario, "List-2" contains four materials: aluminum, steel, polycarbonate plastic, and ABS plastic.

The designer then double-clicks the mouse button on "Aluminum" in the "List-2" window, and a new search window entitled "Recycled Aluminum" opens. The search window specifies "recycled" because this was one of the properties specified in the second "Search All" command; if the designer had double-clicked on "Aluminum" in the "List-1" window, a window entitled "Aluminum" would have appeared, representing all the aluminum databases.

The "Recycled Aluminum" window has four pop-up palettes entitled "Grades", "Properties", "Concerns", and "Resources". The designer reads the contents of the window's scrolling text field which explains the history of aluminum recycling, and how aluminum recycling is accomplished. The designer, interested in the cost, may go to the "Resources" pop-up palette and select "Prices".

The window is now entitled "Recycled Aluminum Prices", and a scrolling text field presents the names, phone numbers and addresses of different providers of recycled aluminum, organized alphabetically by location, with their respective prices. The average U.S. price may representatively be shown to be $180 per ton.

The designer then clicks and holds the mouse button down on the "Full Record" icon at the top of the "Recycled Aluminum Prices" window and drags the icon on top of the "Notes" icon. This copies the full contents of the scrolling field in the current window into the designer's notes.

To determine what manufacturing processes can be used, the designer chooses to go back to the previous window to locate this information. To do this, the designer holds the mouse button down on the title in the window's title bar, and a list of previous windows appears. The user releases the mouse button on the name of the previous window or on the "go back one . . ." menu option. The window is now entitled "Recycled Aluminum" and has the same pop-up palettes as before. In response to the designer selecting "Mfg. Processes" from the "Properties" pop-up palette, the window is now entitled "Recycled Aluminum Manufacturing Processes". The designer reads the scrolling text field and discovers that all conventional milling and machining techniques used for virgin or new aluminum can be used for recycled aluminum; no substantive mechanical or physical property differences exist between the recycled and the virgin material.

To determine the reasons why people might choose to use virgin instead of recycled aluminum, the designer returns to the "Resources" pop-up palette and selects "Prices". The window is now entitled "Recycled Aluminum Prices". The designer then selects "Virgin Aluminum" from the "Grades" pop-up palette.

The window is now entitled "Aluminum Prices", and a scrolling text field containing the names, phone numbers and addresses of different aluminum providers, organized alphabetically by location, with their respective prices is provided. The average U.S. price may representatively be shown to be $200 per ton.

To determine the basis for the difference in the pricing between recycled and virgin aluminum, the designer goes to the "Properties" palette and selects "Origins". The window is now entitled "Aluminum Origins", and has a scrolling text field. As the designer reads the contents of this window, he or she learns about the high cost of mining and refinement of Bauxite, one of the primary elements of aluminum.

To continue searching, the designer returns to the previous manufacturing window by holding the mouse button down on the title in the window's title bar to produce a list of previous windows. The designer releases the mouse button on "Recycled Aluminum Manufacturing Processes", causing the "Recycled Aluminum Manufacturing Processes" window to replace the "Aluminum Origins" window.

Based on this search and the completeness of the data provided using the present invention, the industrial designer may efficiently, effectively, and responsibly make the decision to use recycled, rather than virgin, aluminum in order to minimize costs and any adverse environmental impact. The industrial designer may also, however, consider the other materials presented in the "List-2" window using the present invention.

To consider the other materials, the designer closes the current search window by clicking the close box or by selecting the "Close Search Window" from the "File" pull-down menu. The designer then double-clicks on the item entitled "Steel" in the "List-2" window and follows a pattern of exploration and note-taking throughout this search similar to the search pattern used in the search of aluminum. The materials entitled "Polycarbonate Plastic" and "ABS Plastic" may also be searched in the same manner.

By the end of these searches the designer will have determined that ABS Plastic will meet the needs of the solar-powered street lamp the best but that, unfortunately, the supply of recycled ABS plastic is too low to meet the needs of full production of 1000 or more lamps. Accordingly, the designer's decision to use recycled aluminum may be virtually final. The recycled aluminum materials and manufacturing costs will be under 105 dollars per lamp according to the informal estimates, received from five manufacturers in the Eastern United States, obtained during the search.

In addition to providing an efficient and timely research tool, the present invention also provides an effective means of presenting the designer's research findings to a client or sponsor for approval.

To prepare such a presentation, the designer selects "Print" from the "File" menu at the top of the screen, to open a printing set-up dialog box. From here the designer selects, through a series of checkboxes, desired documentation for printing. For the purposes of this scenario, the designer checks the box labeled "Complete report of each window from the Session". The "Pages" indicator shows that the document to be printed is 43 pages long. To assist the client in navigating the report, the designer checks off the box labeled "Outline", which will limit the print-out to just the names of each search and subsequent window. The "Pages" indicator now shows that the document to be printed is only 2 pages longer. The designer then clicks the "Print" button to begin printing.

The designer may also want to review and print out a copy of the notes taken during the search for his or her own records. To do so, the designer clicks the mouse button on "Notes" from the "Kangaroo" pull-down menu. A window entitled "untitled Kangaroo Session notes" appears with a scrolling text field. The designer reads through the notes, edits out any unnecessary information, and adds comments where appropriate. The designer then goes to the "File" pull-down menu and selects "Print . . . ", checks the box labeled "Notes", and then clicks "O.K.".

The search and documentation now complete, the designer quits using Kangaroo by going to the "File" pull-down menu and selecting "Quit". An alert box appears with the message "This Kangaroo Session has not be saved, and will not be able to be recalled if it is not saved. Would you like to save it?" Clicking the mouse button on the "Save" button produces a standard file save dialog box, into which the designer enters a name under which the session is to be saved, followed by clicking the "O.K." button. The file is saved, and Kangaroo Quits.

Scenario #2—Library Parent Kangaroo

In the second scenario, a public library serves as the Parent Kangaroo. The primary purpose of the public library system is to provide access to books and other information for members of the public generally. The library administration wants to take part in programs that will help the library to be a valuable resource to the community, by fostering educational and intellectual growth. Because of the already established infrastructure and lending mechanisms associated with the public library system, the public library system provides ideal setup sites for the Kangaroo network of the present invention.

The first need of the library is to organize and provide access to the library's own collection, with the second need being to organize and establish the access mechanism to other resources. Budgetary concerns are an ongoing obstacle to the further development of most libraries and must be taken into consideration.

For this scenario the Kangaroo configuration comprises one Parent Kangaroo or server, organized in the library format, and several Joey or client stations, the number to be determined appropriate to the average number of library users.

The library must first configure the Parent Kangaroo by registering the Parent Kangaroo as a server with the Kangaroo network. When registering, the library provides its zip code and modem phone number so that the network can locate the library. The library is then assigned a Parent Kangaroo access number, which will serve as the library's Kangaroo network identity.

The subscribing library enters its name as it will appear on the network, e.g., Anytown, New York, PL#2, which stands for public library number 2 in Anytown, New York. If the library were a State University, the identity would be the university acronym, N.Y.S.U.A. for New York State University at Anytown, and library number, resulting in N.Y.S.U.A. #1.

As the next step, the library selects an organizational format from the Parent Kangaroo configurations. Because it is a library, the standard "Library" format would most likely be selected. Using the "Library" format, the top level pop-up palettes include "Subject", "Author", and "Title". Unless specified otherwise, the contents of each palette include an A–Z categorization.

The library then enters the contents of its current collection. This can be done by entering manually or, since most libraries already have their collections in a database format, the library can import the information. After the information has been imported, the Parent Kangaroo will also need to know the general contents or subject of each entry so that the Kangaroo can cross reference to other entries. If the previous database has related subjects listed for each entry in its databases, this may be accomplished from the import mechanism.

The next step is to register the library's Joeys. These Joeys are locked by the Parent Kangaroo, meaning that they will not be able to select a different default Parent Kangaroo or store any downloaded information beyond the Joey's rewritable buffer. (The rewritable buffer stores any information downloaded but will replace stored information once the buffer has been filled. For a dedicated Joey station, the limit to the buffer is the capacity of the hard drive.) The locked Joeys will still be able to subscribe to Alternate Kangaroos with library approval.

At this point the library Kangaroo system is fully functioning. The Parent Kangaroo begins receiving information from any Alternate Kangaroos to which it has subscribed. Such Alternate Kangaroos may include the Library of Congress or the Smithsonian Institution. If the Parent Kangaroo subscribes to the Library of Congress, the Parent Kangaroo will receive the digital version of each of the books the Library of Congress has in its collection, so that the books may be viewed and referenced from each Joey station. If the Parent Kangaroo subscribes to the Smithsonian Institute, the Parent Kangaroo will begin receiving scanned images of the Smithsonian collections and databases. As this process could take a long time and take up a large amount of storage at each site, the Parent Kangaroo can limit the detail or depth of each subscription, so that only the top level or levels of each subscription may be transferred; each time a Joey accesses beyond those points, the information would be downloaded from the Alternate Kangaroo to the using Joey.

Through the network of the present invention, the library is able to provide the library users, with minimal effort and cost, access to almost endless information, and can afford to spend more time and effort on community projects, knowing that the library's current collection is accessible to people at the library and anywhere in the world. The library will save space and money, subscribing to book depositories and magazines and newspapers via the Kangaroo network, and obviating the need to store the physical copies. As opposed to being subject to the traditional restrictions of building size, and budget limits, the library equipped with the network of the present invention is primarily limited by its digital storage capability.

Scenario #3—XYZ Plastics Inc.

As a third scenario, a company, XYZ Plastics Inc., needs to provide customers and potential customers with information about various products and plastic resins. XYZ Plastics has a large Research and Development division that is constantly modifying and creating new resins. Distribution of printed information is cost-prohibitive, due to the constantly changing nature of the information. XYZ Plastics has a large reference library and many research associates devoted to gathering information about products from competing companies and other related chemical industry sources of information. This reference library has had exponentially increasing costs due to rapid advances in the industry.

XYZ Plastics has two Parent Kangaroos. One is dedicated to in-house use only, meaning it is not connected to a phone line. This dedicated Parent Kangaroo stores the company's proprietary information, and has different levels of security. The second Parent Kangaroo is connected to a phone line and holds product information, press releases and databases for public access; the second Parent Kangaroo also acts as a gateway for employees to research Alternate Kangaroos outside the company. Both Parent Kangaroos are set up in a slightly modified Materials Format. XYZ Plastics has 386 Joeys, for 515 employees, connected to both Parent Kangaroos.

XYZ Plastics must first configure its Parent Kangaroos by registering the Parent Kangaroos as servers with the Kangaroo network. When registering, XYZ Plastics provides its zip code and modem phone number so that the network can locate the XYZ Plastics Kangaroo; the company only provides this information for one of its Parent Kangaroos, since the dedicated in-house Kangaroo will not be connected to a phone line for outside access. XYZ Plastics is then assigned a Parent Kangaroo access number, which will serve as the company's Kangaroo network identity.

XYZ Plastics then enters its name as it will appear on the network. After entering "XYZ Plastics" the company selects an organizational format from the Parent configurations. Because XYZ Plastics is a plastics manufacturer, XYZ Plastics selects the standard "Materials" format. Using this format, the top level pop-up palettes include "Materials", "Properties", and "Concerns"; XYZ Plastics can change the "Concerns" palette to be the "Pricing" palette. Unless specified otherwise, the contents of each palette are in an A–Z categorization.

XYZ Plastics then enters the contents of its existing databases. This can be done by entering manually or, since XYZ Plastics already has its databases in another format, XYZ Plastics just imports the information. After the information has been imported, the Parent Kangaroo will also need to know the general contents or subject of each entry, so that the Kangaroo can cross reference to other entries. If the previous database has related subjects listed for each entry in the databases, this may be accomplished from the import mechanism.

The next step is to register the company Joeys. These Joeys will be partially locked by the Parent Kangaroo, meaning that they will not be able to upload any information to the public Parent Kangaroo, or to an Alternate Kangaroo. The partially locked Joeys will, however, still be able to subscribe to Alternate Kangaroos.

At this point the XYZ Plastics Kangaroos are fully functioning. The public Parent Kangaroo begins receiving information from any Alternate Kangaroos to which it has subscribed. If one of these Alternate Kangaroos is the Society of Plastics Engineers, for example, XYZ begins receiving all of the databases located at the S.P.E. Kangaroo. If the company subscribes to G.E. Plastics, the public Kangaroo begins receiving all of the databases located at the G.E. Plastics Public Kangaroo.

Using the present invention, XYZ Plastics is able to provide current accurate information about all of its products to any potential customers, and is also able to receive feedback from those potential customers. The network of the present invention also provides a way for XYZ Plastics' internal documents and research to be organized and accessed by XYZ Plastics employees. The research being done at the company is more efficient, and thus more cost effective, because the employees can conduct research on almost any topic from their desk, or in the laboratory.

Scenario #4—Simple Subscription Description

As a fourth scenario, a subscriber to a magazine wants to receive the magazine every month on time. The magazine publisher wants to reduce the overhead costs and environmental impact of its publishing, while still retaining the quality of the magazine.

To meet the needs of both the subscriber and the publisher, the subscriber receives a free version of the Joey or client software allowing the subscriber to receive not only the subject magazine, but also any other magazine, as released, directly to the subscriber's home or office computer, without any effort, or lost work time. The Joey may also access other services using a Kangaroo, such as libraries, schools, newspapers, T.V. shows (when technology allows), etc.

In this scenario, the publisher becomes a Parent Kangaroo or server and provides subscribers with an electronic version of the publisher's magazines. Because every page of a magazine is laid out on a publisher's computer, when the magazine is ready to print it is simply added to the publisher's Parent Kangaroo file list, and the publishing is complete—with an overhead cost savings of approximately 70%. These cost savings could be passed directly to the subscribers, devoted to the content of the magazine, or both. Kangaroo publishing may also be used to substantially reduce the environmental impact of publishing, and allow electronic searching and cross referencing of magazine articles with back issues and with other magazine articles on related topics.

It will be apparent to those skilled in the art that various modifications can be made to the on-line database updating network and method of the present invention without departing from the scope or spirit of the invention, and it is intended that the present invention cover modifications and variations of the on-line database updating network system and method provided they come within the scope of the appended claims and their equivalents.

I claim:

1. A method for updating a database using an on-line network including a user terminal, a host terminal, an alternate host terminal, and a communications channel, the user terminal having a display, a data port, and a user-terminal memory for storing user modules of grouped information in a modules folder and in an alternate modules folder, each user-terminal-stored module including a plurality of user-module blocks, the host terminal having a host-terminal memory for storing modules of grouped information, each host-terminal-stored module including a plurality of host-module blocks, and the alternate host terminal having an alternate-host-terminal memory for storing modules of grouped information, each alternate-host-terminal-stored module including a plurality of alternate-host-module blocks, comprising the steps of:

activating the user terminal;

scanning, with the user terminal, the modules folder in the user-terminal memory for stored modules;

locating, in the user-terminal memory and responsive to scanning the modules folder, a first user-terminal-stored module having a first user origin date;

scanning, with the user terminal, the data port for the host terminal;

locating the host terminal on the data port;

connecting, through the communications channel, the user terminal to the host terminal;

scanning, with the user terminal, the host-terminal memory for stored modules;

locating a host-terminal-stored module, corresponding to the first user-terminal-stored-module, having a host origin date;

retrieving the first user origin date of the first user-terminal-stored module;

comparing, by the user terminal, the first user origin date to the host origin date;

scanning, responsive to the host origin date being more recent than the first user origin date, a first plurality of user-module blocks for a respective first plurality of user-module-block origin dates;

scanning the plurality of host-module blocks for a respective plurality of host-module-block origin dates;

comparing the first plurality of user-module-block origin dates to the plurality of host-module-block origin dates, respectively;

identifying a first host-module-block origin date, associated with a first host-module block within the first plurality of host-module blocks, more recent than a respective first user-module-block origin date, associated with a first user-module block within the plurality of user-module blocks;

downloading, over the communications channel, the first host-module block into the user-terminal memory as a host updated block;

updating, responsive to the host updated block, only the first user-module block within the first user-terminal-stored module;

scanning, with the user terminal, the alternate modules folder in the user-terminal memory for stored modules;

locating, in the user-terminal memory and responsive to scanning the alternate modules folder, a second user-terminal-stored module having a second user origin date;

scanning, with the user terminal, the data port for the alternate host terminal;

locating the alternate host terminal on the data port;

connecting, through the communications channel, the user terminal to the alternate host terminal;

scanning, with the user terminal, the alternate-host-terminal memory for stored modules;

locating an alternate-host-terminal-stored module, corresponding to the second user-terminal-stored-module, having an alternate host origin date;

retrieving the second user origin date of the second user-terminal-stored module;

comparing, by the user terminal, the second user origin date to the alternate host origin date;

scanning, responsive to the alternate host origin date being more recent than the second user origin date, a second plurality of user-module blocks for a respective second plurality of user-module-block origin dates;

scanning the plurality of alternate-host-module blocks for a respective plurality of alternate-host-module-block origin dates;

comparing the second plurality of user-module-block origin dates to the plurality of alternate-host-module-block origin dates, respectively;

identifying a first alternate-host-module-block origin date, associated with a first alternate-host-module block within the plurality of alternate-host-module blocks, more recent than a respective second user-module-block origin date, associated with a second user-module block within the second plurality of user-module blocks;

downloading, over the communications channel, the first alternate-host-module block into the user-terminal memory as an alternate-host updated block; and updating, responsive to the alternate-host updated block, only the second user-module block within the second user-terminal-stored module.

2. The method as set forth in claim 1 further comprising, after the step of identifying a first host-module-block origin date, the steps of:

identifying a second host-module-block origin date, associated with a second host-module block within the plurality of host-module blocks, more recent than a respective third user-module-block origin date, associated with a third user-module block within the first plurality of user-module blocks;

downloading, over the communications channel, the first host-module block and the second host-module block into the user-terminal memory as host updated blocks; and updating, responsive to said host updated blocks, corresponding user-module blocks within the user-terminal-stored module.

3. The method as set forth in claim 1, further comprising, after the step of comparing the first plurality of user-module block origin dates to the plurality of host-module block origin dates, for each of the first plurality of user-module blocks, the steps of:

identifying an $n^{th}$ host-module-block origin date, associated with an $n^{th}$ host-module block within the plurality of host-module blocks, more recent than a respective $n^{th}$ user-module-block origin date, associated with an $n^{th}$ user-module block within the first plurality of user-module blocks;

downloading the $n^{th}$ host-module block into the user-terminal memory as an $n^{th}$ host updated block; and updating, responsive to and using the $n^{th}$ host updated block, only the $n^{th}$ user-module block within the first plurality of user-module blocks of the first user-terminal stored module.

4. The method as set forth in claim 1, further comprising, after the step of comparing the second plurality of user-module block origin dates to the plurality of alternate-host-module block origin dates, for each of the second plurality of user-module blocks, the steps of:

identifying an $n^{th}$ alternate-host-module-block origin date, associated with an $n^{th}$ alternate-host-module block within the plurality of alternate-host-module blocks, more recent than a respective $n^{th}$ user-module-block origin date, associated with an $n^{th}$ user-module block within the second plurality of user-module blocks;

downloading the $n^{th}$ alternate host-module block into the user-terminal memory as an $n^{th}$ alternate-host updated block; and updating, responsive to and using the $n^{th}$ alternate-host updated block, only the $n^{th}$ user-module block within the second plurality of user-module blocks of the second user-terminal stored module.

5. The method as set forth in claim 1 further comprising, after the step of identifying a first host-module-block origin date, the steps of:

identifying a new host-module block within the plurality of host-module blocks, the new host-module block having no corresponding user module block within the first plurality of user-module blocks;

downloading, over the communications channel, the first host-module block and the new host-module block into the user-terminal memory as host updated blocks; and updating the first user-terminal-stored module with the host updated blocks.

6. A method of updating a user database using an on-line network including a user terminal, a plurality of host terminals, and a communications channel, the user terminal having a display, a data port, and a user-terminal memory for storing modules of grouped information in a modules folder, each user-terminal-stored module including a plurality of user-module blocks, each host terminal of the plurality of host terminals having a host-terminal memory for storing modules of grouped information, each host-terminal-stored module including a plurality of host-module blocks, comprising the steps of:

starting up, responsive to user initiation, the user terminal;

scanning the modules folder of the user terminal for stored modules;

locating a user-terminal-stored module having a user origin date;

scanning the data port for a host terminal;

locating a host terminal on the data port;

connecting, through the communications channel, the user terminal to the host terminal;

scanning, by the user terminal, the host-terminal memory for stored modules;

locating a host-terminal-stored module, corresponding to the user-terminal-stored-module, having a host origin date;

retrieving the user origin date of the user-terminal-stored module;

comparing, by the user terminal, the user origin date to the host origin date;

scanning, responsive to the host origin date being more recent than the user origin date, a plurality of user-module blocks within the user-terminal-stored module for a respective plurality of user-module-block origin dates;

scanning a plurality of host-module blocks within the host-terminal stored-module for a respective plurality of host-module-block origin dates;

comparing a first user-module-block origin date to a corresponding first host-module-block origin date;

comparing a second user-module-block origin date to a corresponding second host-module-block origin date;

comparing an $n^{th}$ user-module-block origin date to a corresponding $n^{th}$ host-module-block origin date;

identifying a host-module-block origin date more recent than a respective user-module-block-origin date as a newer origin date;

downloading, over the communications channel, only a host-module block associated with the newer origin date into the user-terminal memory as an updated block;

replacing, with the updated block, only a user-module-block corresponding to the updated block; and updating the user origin date.

7. The method as set forth in claim 6, further comprising, after the step of updating the user origin date, the steps of:

disconnecting the user terminal from the host terminal;

locating an $n^{th}$ host terminal of the plurality of host terminals on the data port;

connecting, through the communications channel, the user terminal to the $n^{th}$ host terminal;

scanning, by the user terminal, an $n^{th}$ host-memory for stored modules;

locating an $n^{th}$-host-terminal-stored module, corresponding to the user-terminal-stored module, having an $n^{th}$-host origin date;

retrieving, from the user terminal, the user origin date of the user-terminal-stored module;

comparing, by the user terminal, the user origin date to the $n^{th}$-host origin date;

scanning, responsive to the $n^{th}$-host origin date being more recent than the user origin date, the plurality of user-module blocks for the respective plurality of user-module-block origin dates;

scanning a plurality of $n^{th}$-host-module blocks for a respective plurality of $n^{th}$-host-module-block origin dates;

comparing the plurality of user-module block origin dates to the plurality of $n^{th}$-host-module-block origin dates, respectively;

identifying an $n^{th}$-host-module-block origin date, associated with an $n^{th}$-host-module block within the $n^{th}$-host-terminal-stored module, more recent in time than a respective user-module-block origin date associated with a user-module block within said user-terminal-stored module;

downloading, over the communications channel, only the nth-host-module block into the user-terminal memory as a downloaded updated block;

replacing only the user-module block within said user-terminal-stored module corresponding with the downloaded updated block; and updating the user origin date of said user-terminal-stored module.

8. The method as set forth in claim 6 wherein the host-module block associated with the newer origin date corresponds to a first user-module-block having the first user-module-block origin date.

9. The method as set forth in claim 8, further comprising, after the step of updating the user origin date, the steps of:

disconnecting the user terminal from the host terminal;

locating an $n^{th}$ host terminal of the plurality of host terminals on the data port;

connecting, through the communications channel, the user terminal to the $n^{th}$ host terminal;

scanning, by the user terminal, an $n^{th}$ host-memory for stored modules;

locating an $n^{th}$-host-terminal-stored module, corresponding to the user-terminal-stored module, having an $n^{th}$-host origin date;

retrieving, from the user terminal, the user origin date of the user-terminal-stored module;

comparing, by the user terminal, the user origin date to the $n^{th}$-host origin date;

scanning, responsive to the $n^{th}$-host origin date being more recent than the user origin date, the plurality of user-module blocks for the respective plurality of user-module-block origin dates;

scanning a plurality of $n^{th}$-host-module blocks for a respective plurality of $n^{th}$-host-module-block origin dates;

comparing the plurality of user-module block origin dates to the plurality of $n^{th}$-host-module-block origin dates, respectively;

identifying an $n^{th}$-host-module-block origin date, associated with an $n^{th}$-host-module block within the $n^{th}$-host-terminal-stored module, more recent in time than a respective user-module-block origin date associated with a user-module block within said user-terminal-stored module;

downloading, over the communications channel, only the $n^{th}$-host-module block into the user-terminal memory as a downloaded updated block;

replacing only the user-module block within said user-terminal-stored module corresponding with the downloaded updated block; and updating the user origin date of said user-terminal-stored module.

10. The method as set forth in claim 9 wherein the $n^{th}$-host-module block corresponds to the first user-module-block.

11. The method as set forth in claim 9 wherein the $n^{th}$-host-module block corresponds to a second user-module-block having the second user-module-block origin date.

12. A method of updating databases using an on-line network including a user terminal, a host terminal, and a communications channel, the user terminal having a display, a data port, and a user-terminal memory for storing modules of grouped information in a modules folder, each user-terminal-stored module including a plurality of user-module blocks, the host terminal having a host-terminal memory for storing modules of grouped information, each host-terminal-stored module including a plurality of host-module blocks, comprising the steps of:

starting up the user terminal;

scanning the modules folder for stored modules;

locating a user-terminal-stored module having a user origin date;

scanning the data port for the host terminal;

locating the host terminal on the data port;

connecting, through the communications channel, the user terminal to the host terminal;

scanning, by the user terminal, the host-terminal memory for stored modules;

locating a host-terminal-stored module, corresponding to the user-terminal-stored-module, having a host origin date;

retrieving the user origin date of the user-terminal-stored module;

comparing, by the user terminal, the user origin date to the host origin date;

scanning, responsive to the host origin date being more recent than the user origin date, the plurality of user-module blocks for a respective plurality of user-module-block origin dates;

scanning the plurality of host-module blocks for a respective plurality of host-module-block origin dates;

comparing a first user-module-block origin date to a corresponding first host-module-block origin date;

comparing a second user-module-block origin date to a corresponding second host-module-block origin date;

comparing an $n^{th}$ user-module-block origin date to a corresponding $n^{th}$ host-module-block origin date;

identifying host-module-block origin dates more recent than respective corresponding user-module-origin dates as replacement origin dates;

downloading, over the communications channel, responsive to the first host-module-block-origin date being more recent than the first user-module-block origin date, a first-host-module block associated with the first host-module-block-origin date into the user-terminal memory;

downloading, over the communications channel, responsive to the second host-module-block-origin date being more recent than the second user-module-block origin date, a second-host-module block associated with the second host-module-block-origin date into the user-terminal memory;

downloading, over the communications channel, responsive to the $n^{th}$ host-module-block-origin date being more recent than the $n^{th}$ user-module-block origin date, an $n^{th}$-host-module block associated with the $n^{th}$ host-module-block-origin date into the user-terminal memory; and updating only those user-module blocks within the user-terminal-stored module corresponding with the first host-module-block, the second-host-module block, and the $n^{th}$-host-module block.

13. A communications network for selectively updating a plurality of user module blocks of information, said communications network comprising:

a communications channel;

a user terminal, operatively coupled to said communications channel, for retrieving updated module blocks of information through said communications channel, said user terminal including, a user memory for storing a plurality of user modules, each of said plurality of user modules having a plurality of user module blocks of information;

a user processor for scanning said user memory for a user module and, responsive to locating a user module, for accessing said communications channel; and a host terminal, operatively coupled to said user terminal through said communications channel, for sending host module blocks of information to said user terminal, said host terminal including, a host memory for storing a plurality of host modules, each of said plurality of host modules having a plurality of host module blocks of information;

a host processor, responsive to a first host module block of information being more recent than a corresponding first user module block of information, for sending, over said communications channel, the first host module block of information; and an alternate host terminal, operatively coupled to said user terminal through said communications channel, for sending alternate host module blocks of information to said user terminal, said alternate host terminal including, an alternate host memory for storing a plurality of alternate host modules, each of said plurality of alternate host modules having a plurality of alternate host module blocks of information; and an alternate host processor, responsive to a first alternate host module block of information being more recent than a corresponding user module block of information for sending, over said communications channel, the first alternate host module block of information.

14. The communications network as set forth in claim 13, said alternate host terminal further comprising an alternate host input device for inputting data to said alternate host terminal.

15. The communications network as set forth in claim 13, with the plurality of module blocks of information stored in said alternate host memory including at least one of a non-updated-alternate-host-module block of information and an updated-alternate-host-module block of information.

16. A communications network as set forth in claim 13, with said user processor, responsive to receiving the origin date for the alternate host module block of information, for comparing the origin date for the alternate host module block of information to a corresponding user-module-block-of-information origin date and, responsive to determining the origin date for the alternate host module block of information to be more recent than the corresponding user-module-block-of-information origin date, for downloading the alternate host module block of information to said user memory.

17. The communications network as set forth in claim 13, said host terminal further comprising a host input device for inputting data to said host terminal.

18. A method of updating a plurality of user module blocks within a user module using a network, the network including a user terminal, a plurality of host terminals, and a communications channel, the user terminal having a user memory for storing user modules, each stored user module including a plurality of user-module blocks, each host terminal of the plurality of host terminals having a host memory for storing host modules, each stored host module including a plurality of host-module blocks, comprising the steps of:

scanning the user memory for a stored user module;

locating a user module, the user module having a user module origin date;

locating a first host terminal of the plurality of host terminals on the communications channel;

connecting, through the communications channel, the user terminal to the first host terminal;

scanning a first host memory for a stored host module;

locating a stored host module, corresponding to the user module, the stored host module having a host module origin date;

comparing the user module origin date to the host module origin date;

scanning, responsive to the host module origin date being more recent than the user module origin date, a plurality of user-module blocks within said user module for a respective plurality of user-module-block origin dates;

scanning a plurality of host-module blocks within said stored host module for a respective plurality of host-module-block origin dates;

comparing the plurality of user-module-block origin dates to the plurality of host-module-block origin dates, respectively;

identifying a first host-module-block origin date, associated with a first host-module block within the plurality of host-module blocks, more recent in time than a respective first user-module-block origin date, associated with a first user-module block within the plurality of user-module blocks;

downloading over the communications channel, the first host-module block into the user-terminal memory as a downloaded updated block;

replacing the first user-module block with the downloaded updated block;

updating the user module origin date and the user-module-block origin date;

disconnecting the user terminal from the first host terminal;

locating a second host terminal of the plurality of host terminals on the communications channel;

connecting, through the communications channel, the user terminal to the second host terminal;

scanning a second-host-memory for a stored second-host module;

locating a stored second-host module, corresponding to the user module, having a second-host-module origin date;

comparing the user module origin date to the second-host-module origin date;

scanning, responsive to the second-host-module origin date being more recent than the user module origin date, the plurality of user-module blocks for a respective plurality of user-module-block origin dates;

scanning a plurality of second-host-module blocks for a respective plurality of second-host-module-block origin dates;

comparing the plurality of user-module-block origin dates to the plurality of second-host-module-block origin dates, respectively;

identifying a first second-host-module-block origin date, associated with a first second-host-module block within the stored second-host module, more recent in time than a respective second user-module-block origin date, associated with a second user-module block within said user module;

downloading, over the communications channel, the first second-host-module block into the user-terminal memory as a downloaded updated block;

replacing the second user-module block within said user module with the downloaded updated block; and updating the user module origin date and the second user-module-block origin date.

19. A method for updating a plurality of user modules stored in a memory of a user terminal, the user terminal being coupled to a host terminal and to an alternate host terminal via a communications channel, the host terminal having a host memory storing a plurality of host modules, the alternate host terminal having an alternate host memory storing a plurality of alternate host modules, the method comprising the steps of:

(a) locating in the user terminal memory a first user module;

(b) locating in the host memory a host module corresponding to the first user module;

(c) comparing the first user module to the host module and, responsive to the host module being more recent than the first user module:
  (i) scanning a first plurality of user-module blocks within the first user module;
  (ii) scanning a plurality of host-module blocks within the host module;
  (iii) identifying a first host-module block within the host module, more recent than a respective first user-module block within the first user module;
  (iv) downloading, over the communications channel, the first host-module block into the user memory as a host updated block; and
  (v) updating, responsive to the host updated block, the first user-module block within the first user module;

(d) identifying in the user terminal memory a second user module;

(e) identifying in the alternate host memory an alternate-host module corresponding to the second user module; and (f) comparing the second user module to the alternate-host module and, responsive to the alternate-host module being more recent than the second user module:
  (i) scanning a second plurality of user-module blocks within the second user module;
  (ii) scanning a plurality of alternate-host-module blocks within the alternate host module;
  (iii) identifying a first alternate-host-module block within the alternate-host module, more recent than a respective second user-module block within the second user module;
  (iv) downloading, over the communications channel, the first alternate-host-module block into the user terminal memory as an alternate-host updated block; and
  (v) updating, responsive to the alternate-host updated block, the second user-module block within the second user module.

20. A method of updating a plurality of user-module blocks of information using a network including a user terminal and a plurality of host terminals connected by a communications channel, the user terminal having a user-terminal memory for storing a plurality of user modules, each user-terminal-stored module including a plurality of user-module blocks, each host terminal of the plurality of host terminals having a host-terminal memory for storing host modules, each host-terminal-stored stored module including a plurality of host-module blocks, comprising the steps of:

scanning the user-terminal memory for a stored user module;

locating a user-terminal-stored module;

scanning the host-terminal memory for a stored host module;

locating a host-terminal-stored module corresponding to the user-terminal-stored-module;

comparing, responsive to the host-terminal-stored module being more recent than the user-terminal-stored module, a plurality of user-module blocks within the user-terminal-stored module and a plurality of host-module blocks within the host-terminal stored-module;

downloading, over the communications channel, responsive to a first host-module block being more recent than a corresponding first user-module block, the first host-module block into the user-terminal memory;

downloading, over the communications channel, responsive to a second host-module block being more recent than a corresponding second user-module block, the second host-module block into the user-terminal memory;

downloading, over the communications channel, responsive to an $n^{th}$ host-module block being more recent than a corresponding $n^{th}$ user-module block, the $n^{th}$ host-module block into the user-terminal memory; and updating the first user-module block, the second user-module block, and the $n^{th}$ user-module block with the first host-module block, the second host-module block, and the $n^{th}$ host-module block, respectively.

21. A method of updating a plurality of user module blocks using a network including a user terminal and a host terminal connected by a communications channel, the user terminal having a user-terminal memory for storing user modules, each user module including a plurality of user-module blocks, the host terminal having a host-terminal memory for storing host modules, each host module including a plurality of host-module blocks, comprising the steps of:

identifying in the user-terminal memory a user module;

identifying in the host-terminal memory a host module corresponding to the user module;

comparing, responsive to the host module being more recent than the user module, a plurality of user-module blocks within the user module and a plurality of host-module blocks within the host module;

identifying a first host-module block corresponding to a first user-module block;

downloading, over the communications channel, responsive to the first host-module block being more recent than the first user-module block, the first host-module block into the user-terminal memory;

identifying a second host-module block corresponding to a second user-module block;

downloading, over the communications channel, responsive to the second host-module block being more recent than the second user-module block, the second host-module block into the user-terminal memory;

identifying an $n^{th}$ host-module block corresponding to an $n^{th}$ user-module block;

downloading, over the communications channel, responsive to the $n^{th}$ host-module block being more recent than the $n^{th}$ user-module block, the $n^{th}$ host-module block into the user-terminal memory; and updating the first user-module block, the second user-module block and the $n^{th}$ user-module block within the user module with the first host-module block, the second host-module block, and the $n^{th}$ host-module block, respectively.

\* \* \* \* \*

UNITED STATES PATENT AND TRADEMARK OFFICE
CERTIFICATE OF CORRECTION

PATENT NO. : 5,694,596
DATED : December 2, 1997        Page 1 of 2
INVENTOR(S) : R.D.L. Campbell It is certified that error appears in the above-indentified patent and that said Letters Patent is hereby corrected as shown below:

| COLUMN | LINE | |
|---|---|---|
| [56] Pg. 1, col. 1 | Refs. Cited (U.S. Pat. Docs, Item 6) | "Witeh et al." should read --Witek et al.-- |
| [56] Pg. 1, col. 1 | Refs. Cited (U.S. Pat. Docs, Item 9) | "Pytleck et al." should read --Pytlik et al.-- |
| [56] Pg. 1, col. 2 | Refs. Cited (Other Publs.) | Please insert the following references: <br><br> --IBM Technical Disclosure Bulletin, May 1993, US "Hash Index For Locating Tuples In A Distributed Or Parallel Database" <br><br> "The Art Of Computer Programming" Vol. 3, "Sorting and Searching" by Knuth D.E. pp. 99-102: 506-514-- |
| 27 (Claim 7, | 61 line 34) | "nth-host-module" should read --$n^{th}$-host-module-- |
| 30 (Claim 13, | 1-4 lines 16-19) | Unindent the following paragraph once to make it a subparagraph of the main paragraph: "a host terminal, . . . said host terminal including," |

UNITED STATES PATENT AND TRADEMARK OFFICE
CERTIFICATE OF CORRECTION

PATENT NO. : 5,694,596
DATED : December 2, 1997
INVENTOR(S) : R.D.L. Campbell

It is certified that error appears in the above-indentified patent and that said Letters Patent is hereby corrected as shown below:

| COLUMN | LINE | |
|---|---|---|
| 30 (Claim 13, | 18-26 lines 33-41) | Indent once further the following two paragraphs to make them subparagraphs of the immediately preceding paragraph: "an alternate host memory . . . block of information." |
| 31 (Claim 18, | 25 line 41) | After "downloading" insert --,-- |
| 32 (Claim 20, | 62 line 9) | After "host-terminal-stored" delete "stored" |

Signed and Sealed this

Eighteenth Day of August, 1998

Attest:

BRUCE LEHMAN

Attesting Officer

Commissioner of Patents and Trademarks